US008115748B2

(12) United States Patent
Clary

(10) Patent No.: US 8,115,748 B2
(45) Date of Patent: *Feb. 14, 2012

(54) ELECTRONICALLY CAPTURING HANDWRITTEN DATA

(75) Inventor: Gregory J Clary, Apex, NC (US)

(73) Assignee: ADS Software MGMT. L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,646

(22) Filed: Jun. 18, 2010

(65) Prior Publication Data

US 2010/0309131 A1 Dec. 9, 2010

Related U.S. Application Data

(60) Continuation of application No. 11/426,860, filed on Jun. 27, 2006, now Pat. No. 7,777,729, which is a division of application No. 09/540,469, filed on Mar. 31, 2000, now Pat. No. 7,091,959.

(60) Provisional application No. 60/127,196, filed on Mar. 31, 1999.

(51) Int. Cl.
  *G09G 5/00* (2006.01)
(52) U.S. Cl. .................................. 345/173; 345/179
(58) Field of Classification Search .......... 345/173–179; 178/18.01, 18.03, 18.05, 18.09, 19.01, 20.01
See application file for complete search history.

(56) References Cited

U.S. PATENT DOCUMENTS

| | | |
|---|---|---|
| 4,793,810 A | 12/1988 | Beasley, Jr. |
| D308,364 S | 6/1990 | Beasley, Jr. et al. |
| RE33,498 E | 12/1990 | Proulx et al. |
| 5,060,980 A | 10/1991 | Johnson et al. |
| 5,063,600 A | 11/1991 | Norwood |
| 5,113,041 A | 5/1992 | Blonder et al. |
| 5,187,774 A | 2/1993 | Ericson |
| 5,243,149 A | 9/1993 | Comerford et al. |
| RE34,476 E | 12/1993 | Norwood |
| 5,287,417 A | 2/1994 | Eller et al. |
| 5,347,477 A | 9/1994 | Lee |
| 5,392,390 A | 2/1995 | Crozier |
| 5,455,901 A | 10/1995 | Friend et al. |
| 5,459,796 A | 10/1995 | Boyer |
| 5,463,696 A | 10/1995 | Beernink et al. |
| 5,465,325 A | 11/1995 | Capps et al. |
| 5,493,692 A | 2/1996 | Theimer et al. |
| 5,528,154 A | 6/1996 | Leichner et al. |
| 5,544,295 A | 8/1996 | Capps |

(Continued)

FOREIGN PATENT DOCUMENTS

WO    0116691 A1    3/2001

(Continued)

OTHER PUBLICATIONS

Website: info@anoto.com; http://www.anoto.com/main.asp, dated Jul. 26, 2000, 16 total pages, Copyright 2000.

(Continued)

*Primary Examiner* — Srilakshmi K Kumar
(74) *Attorney, Agent, or Firm* — Brundidge & Stanger, P.C.

(57) ABSTRACT

A method and apparatus are provided for electronically capturing handwritten data using a computing device having a handwriting capture interface. The method includes detecting a position associated with an actuation of the handwriting capture interface to define a handwritten input, and defining a bounding box encompassing at least a portion of individual strokes of the handwritten input. In addition, the method includes storing the handwritten input and the bounding box.

19 Claims, 9 Drawing Sheets

U.S. PATENT DOCUMENTS

| | | |
|---|---|---|
| 5,544,321 A | 8/1996 | Theimer et al. |
| 5,555,376 A | 9/1996 | Theimer et al. |
| 5,559,942 A | 9/1996 | Gough et al. |
| 5,561,446 A | 10/1996 | Montlick |
| 5,577,135 A | 11/1996 | Grajski et al. |
| 5,583,543 A | 12/1996 | Takahashi et al. |
| 5,587,560 A | 12/1996 | Crooks et al. |
| 5,596,694 A | 1/1997 | Capps |
| 5,600,735 A | 2/1997 | Seybold |
| 5,603,054 A | 2/1997 | Theimer et al. |
| 5,611,050 A | 3/1997 | Theimer et al. |
| 5,625,833 A | 4/1997 | Levine et al. |
| 5,627,349 A | 5/1997 | Shetye et al. |
| 5,629,499 A | 5/1997 | Flickinger et al. |
| 5,652,412 A | 7/1997 | Lazzouni et al. |
| 5,661,506 A | 8/1997 | Lazzouni et al. |
| 5,666,530 A | 9/1997 | Clark et al. |
| 5,680,636 A | 10/1997 | Levine et al. |
| 5,682,439 A | 10/1997 | Beernink et al. |
| 5,704,029 A | 12/1997 | Wright, Jr. |
| 5,737,443 A | 4/1998 | Guzik et al. |
| 5,737,740 A | 4/1998 | Henderson et al. |
| 5,740,273 A | 4/1998 | Parthasarathy et al. |
| 5,742,705 A | 4/1998 | Parthasarathy |
| 5,751,851 A | 5/1998 | Guzik et al. |
| 5,787,312 A | 7/1998 | Suzuki |
| 5,797,089 A | 8/1998 | Nguyen |
| 5,812,865 A | 9/1998 | Theimer et al. |
| 5,813,771 A | 9/1998 | Ur et al. |
| 5,818,425 A | 10/1998 | Want et al. |
| 5,838,819 A | 11/1998 | Ruedisueli et al. |
| 5,850,214 A | 12/1998 | McNally et al. |
| 5,898,156 A | 4/1999 | Wilfong |
| 5,900,943 A | 5/1999 | Owen |
| 5,903,666 A | 5/1999 | Guzik et al. |
| 5,921,582 A | 7/1999 | Gusak |
| 5,930,380 A | 7/1999 | Kashi et al. |
| 6,005,973 A | 12/1999 | Seybold et al. |
| 6,012,073 A | 1/2000 | Arend et al. |
| 6,018,591 A | 1/2000 | Hull et al. |
| 6,050,490 A | 4/2000 | Leichner et al. |
| 6,055,552 A | 4/2000 | Curry |
| 6,128,006 A | 10/2000 | Rosenberg et al. |
| 6,141,570 A | 10/2000 | O'Neill et al. |
| 6,151,611 A | 11/2000 | Siegel |
| 6,153,836 A | 11/2000 | Goszyk |
| 6,219,731 B1 | 4/2001 | Gutowitz |
| 6,259,043 B1 | 7/2001 | Clary et al. |
| 6,272,506 B1 | 8/2001 | Bell |
| 6,295,372 B1 | 9/2001 | Hawkins et al. |
| 6,304,898 B1 | 10/2001 | Shiigi |
| 6,311,042 B1 | 10/2001 | DeSchrijver |
| 6,323,803 B1 | 11/2001 | Jolley et al. |
| 6,330,976 B1 | 12/2001 | Dymetman et al. |
| 6,333,994 B1 | 12/2001 | Perrone et al. |
| 6,374,259 B1 | 4/2002 | Celik |
| 6,384,848 B1 | 5/2002 | Kojima et al. |
| 6,396,481 B1 | 5/2002 | Challa |
| 6,408,178 B1 | 6/2002 | Wickstrom et al. |
| 6,424,426 B1 | 7/2002 | Henry |
| 6,431,439 B1 | 8/2002 | Suer et al. |
| 6,445,468 B1 | 9/2002 | Tsai |
| 6,456,740 B1 | 9/2002 | Carini et al. |
| 6,463,413 B1 | 10/2002 | Applebaum et al. |
| 6,548,768 B1 | 4/2003 | Pettersson et al. |
| 6,553,131 B1 | 4/2003 | Neubauer et al. |
| 6,564,249 B2 | 5/2003 | Shiigi |
| 6,592,039 B1 | 7/2003 | Smith et al. |
| 6,615,183 B1 | 9/2003 | Kolls |
| 6,622,128 B1 | 9/2003 | Bedell et al. |
| 6,644,764 B2 | 11/2003 | Stephens, Jr. |
| 6,651,894 B2 | 11/2003 | Nimura et al. |
| 6,654,768 B2 | 11/2003 | Celik |
| 6,655,586 B1 | 12/2003 | Back et al. |
| 6,663,008 B1 | 12/2003 | Pettersson et al. |
| 6,678,441 B1 | 1/2004 | Taylor |
| 6,678,864 B1 | 1/2004 | Tsai |
| 6,681,045 B1 | 1/2004 | Lapstun et al. |
| 6,689,966 B2 | 2/2004 | Wiebe |
| 6,698,660 B2 | 3/2004 | Fahraeus et al. |
| 6,718,061 B2 | 4/2004 | Lapstun et al. |
| 6,719,470 B2 | 4/2004 | Berhin |
| 6,720,985 B1 | 4/2004 | Silverbrook et al. |
| 6,722,574 B2 | 4/2004 | Skantze et al. |
| 6,732,927 B2 | 5/2004 | Olsson et al. |
| 6,741,749 B2 | 5/2004 | Herbert, Jr. |
| 6,755,129 B2 | 6/2004 | Schneider et al. |
| 6,798,907 B1 | 9/2004 | Clary et al. |
| 6,826,551 B1 | 11/2004 | Clary et al. |
| 6,912,308 B2 | 6/2005 | Reintjes et al. |
| 7,091,959 B1 | 8/2006 | Clary |
| 7,231,594 B1 | 6/2007 | Hitchcock et al. |
| 2001/0016856 A1 | 8/2001 | Tsuji et al. |
| 2001/0038383 A1 | 11/2001 | Ericson et al. |
| 2001/0038711 A1 | 11/2001 | Williams et al. |
| 2002/0011989 A1 | 1/2002 | Ericson et al. |
| 2002/0044134 A1 | 4/2002 | Ericson et al. |
| 2002/0050982 A1 | 5/2002 | Ericson |
| 2002/0056576 A1 | 5/2002 | Ericson |
| 2002/0059367 A1 | 5/2002 | Romero et al. |
| 2002/0107885 A1 | 8/2002 | Brooks et al. |
| 2003/0061188 A1 | 3/2003 | Wiebe et al. |
| 2003/0066896 A1 | 4/2003 | Pettersson et al. |
| 2004/0036681 A1 | 2/2004 | Kluttz et al. |
| 2004/0095337 A1 | 5/2004 | Pettersson et al. |
| 2004/0113898 A1 | 6/2004 | Pettersson et al. |
| 2004/0196473 A1 | 10/2004 | Silverbrook et al. |
| 2004/0201602 A1 | 10/2004 | Mody et al. |
| 2004/0236741 A1 | 11/2004 | Burstrom et al. |
| 2006/0233441 A1 | 10/2006 | Clary |

FOREIGN PATENT DOCUMENTS

| | | |
|---|---|---|
| WO | 0125891 A1 | 4/2001 |

OTHER PUBLICATIONS

Website: http://www.ecritek.com/company/company.html; Ecrio User Manual (pp. 1-52), 54 total pages, Ecritek Corporation, Copyright 2000 Ecritek Corporation.

Website: Ecrio, Inc.; "Welcome to ecrio.com, Ecrio, Inc." http://www.ecrio.com, 10 total selected pages.

Website: Ecrio, Inc., "Ecrio White Paper" http://www.ecrio.com/products/p_htm, 10 total pages.

Website: Ecritek Corp., "About Ecritek Corporation" http://www.ecritek.com/company/company.html, 54 total pages.

Website: Anoto AB, "Anoton—join the revolution" http://www.anoto.com, 29 total selected pages.

Website: Anoto, AB, "Anoto—Home" http://www.anoto.com/main.asp, 16 total pages.

Anoto, AB, "A comparison of Anoto Technology with Other Relevant Systems," available at http://www.anoto.com/pressroom/bin/comparison.pdf, 17 total pages.

Anoto, AB, "Technical Brochure," available at http://www.anoto.com/pressroom/bin/technical_brochure.pdf, 16 total pages.

Anoto, AB, "Anoto Pen," available at http://www.anoto.com/pressroom/bin/anoto_pen.pdf, 1 total pages.

Anoto, AB, "Applications Illustrations," available at http://www.anoto.com/pressroom/bin/Applications_illus.pdf, 1 total page.

Website: Seiko Instruments USA Inc., "Seiko Instruments—Business and Home Office Products Division" http://www.seikosmart.com, 7 total pages.

Website: Electric Pocket Limited, "BugMe.net: Yellow Stickies for your Palm OS Handheld!" http://www.bugme.net, 15 total selected pages.

Electric Pocket Limited, "BugMe! User Guide," available at http://www.bugme.net/BugMe.pdf, 7 total pages.

Electric Pocket Limited, "BugMe! Messenger User Guide," available at http://www.bugme.net/BugMeMessenger.pdf, 8 total pages.

Electric Pocket Limited, "Bug Me! for Palm OS", 4 total pages.

Nathan et al., "Real-Time On-Line Unconstrained Handwriting Recognition Using Statistical Methods," 1995 Int'l Conference on Acoustics, Speech and Signal Processing, May 1995, vol. 4, pp. 2619-2622.

Nosary et al., "A Step Towards the Use of Writer's Properties for Text Recognition," IEE Third European Workshop on Handwriting Analysis and Recognition, Jul. 1998, pp. 16/1-16/6.

Elliman et al., "The Use of Extended Trigrams for Contextual Word Recognition," IEE Workshop on Handwriting Analysis and Recognition—A European Perspective, May 1996, pp. 1011-1015.

Downton et al., "Lazy Evaluation for Best-First Contextual Handwriting Recognition," Proceedings of the 5th Int'l Conference on Document Analysis and Recognition, Sep. 1999, pp. 589-592.

Amano et al., "DRS: A Workstation-Based Document Recognition System for Text Entry," Computer, Jul. 1992, vol. 25, Iss. 7, pp. 67-71.

Du et al., "Computationally Efficient Contextual Processing for Handwritten Forms," IEE Workshop on Handwriting Analysis and Recognition—A European Perspective, May 1996, pp. 8/1-8/5.

Downton et al., "Visual Programming Paradigms for Handwriting Applications," IEE European Workshop on Handwriting Analysis and Recognition: A European Perspective, Jul. 1994, pp. 21/1-21/8.

Pavlidis et al., "Off-Line Recognition of Signatures Using Revolving Active Deformable Models," 1994 IEEE International Conference on Systems, Man and Cybernetics, Oct. 1994, vol. 1, pp. 771-776.

Kim et al., "Handwritten Word Recognition for Real-Time Applications," Proceedings of the 3rd International Conference on Document Analysis and Recognition, Aug. 1995, vol. 1, pp. 24-27.

Munich et al., "Visual Input for Pen-Based Computers," Proceedings of the 13th Int'l. Conference on Pattern Recognition, Aug. 1996, vol. 3, pp. 33-37.

Smithies, CPK, "The Handwritten Signature in Pen Computing," IEE Colloquium on Handwriting and Pen-Based Input, 1994, pp. 2/1-2/3.

Beigi et al., "Size Normalization in On-Line Unconstrained Handwriting Recognition," IEEE International Conference on Image Processing, Nov. 1994, vol. 1, pp. 169-173.

Jeremy J. Heiner, Scott E. Hudson, Kenichiro Tanaka; "Linking and Messaging from Real Paper in the Paper PDA" Proceedings of the 12th Annual ACM Symposium on User Interface Software and Technology Online, Nov. 1999; pp. 179-186; vol. 1, No. 1; XP002177313; Asheville, North Carolina, USA; Retrieved from the internet; http://www.acm.org/pubs/citations/proceedings/uist/320719/p179-heiner.

Patent Cooperation Treaty—Notification of Transmittal of the International Search Report or the Declaration; International Searching Authority; regarding PCT/US01/14009, filed May 1, 2001; mailed Sep. 26, 2001; Application Advanced Digital Systems, Inc.

Matic, N., Pen-Based Visitor Registration System (PENGUIN), IEEE, 1058-6393/95, 1995, pp. 298-302.

Daily Schedule — 228

| JAN | FEB | MAR | APR | MAY | JUN | JUL | AUG | SEP | OCT | NOV | DEC |

| 0 | 1 | 2 | 3 |

230

—232—

| 0 | 1 | 2 | 3 | 4 | 5 | 6 | 7 | 8 | 9 |

To Do List

| JAN | FEB | MAR | APR | MAY | JUN | JUL | AUG | SEP | OCT | NOV | DEC |

| 0 | 1 | 2 | 3 |

| 0 | 1 | 2 | 3 | 4 | 5 | 6 | 7 | 8 | 9 |

| 1 | ✓ |
|---|---|
| High | Med | Low |

| 2 | ✓ |
|---|---|
| High | Med | Low |

| 3 | ✓ |
|---|---|
| High | Med | Low |

| 4 | ✓ |
|---|---|
| High | Med | Low |

| 5 | ✓ |
|---|---|
| High | Med | Low |

| 6 | ✓ |
|---|---|
| High | Med | Low |

| 7 | ✓ |
|---|---|
| High | Med | Low |

| 8 | ✓ |
|---|---|
| High | Med | Low |

| 9 | ✓ |
|---|---|
| High | Med | Low |

| 10 | ✓ |
|---|---|
| High | Med | Low |

FIGURE 5

Notes

Note

FIGURE 6

ELECTRONICALLY CAPTURING HANDWRITTEN DATA

CROSS-REFERENCE TO RELATED APPLICATIONS

This application is a continuation of U.S. application Ser. No. 11/426,860, filed Jun. 27, 2006, which is a divisional of U.S. application Ser. No. 09/540,469, filed Mar. 31, 2000, now U.S. Pat. No. 7,091,959, which claims the benefit of U.S. Provisional Application No. 60/127,196, filed Mar. 31, 1999, wherein the contents of the above listed applications and patents are hereby incorporated by reference.

FIELD

The present invention relates generally to data processing with pen enabled computing devices and, more particularly, to a system, computer program product, computing device, and associated methods for electronically identifying preprinted forms used in conjunction with pen enabled computing devices and accessing and manipulating information associated therewith.

BACKGROUND

Pen-enabled computing is a relatively recent development wherein a user interfaces with a computing system by way of a writing stylus instead of a mouse or a keyboard. In some instances, a pen-enabled computing system provides an electronic writing tablet having an overlaid writing surface. Such a writing surface may comprise, for example, a blank sheet of paper or a preprinted form. The writing stylus, in turn, may comprise a device capable of inputting data (a "handwriting input") into the pen-enabled computing system while providing both a visible, or "written ink," copy of the data on the writing surface and an "electronic" copy of the data within the pen-enabled computing system. Such a writing stylus may comprise, for example, a conventional pen, a conventional pencil, a radio transmitter, a magnetic or electric field device, an ultrasound transceiver, or combinations thereof.

Once the electronic copy of the data is entered into the pen-enabled computing system, the data may be stored as an "electronic ink" copy, wherein the handwriting input is captured as written, typically as a sequence of (x, y) coordinate pairs, a bit map or the like, or as a "text" copy, wherein the handwriting input is captured, recognized, and translated into the corresponding text, typically by automatic online handwriting recognition or the like. In some instances, the pen-enabled computing system may be capable of producing both an electronic ink and a text copy of the handwriting input. Since the writing stylus is generally capable of providing a written ink copy of the handwriting input on the writing surface, the user is automatically provided with a hard copy, or visual feed back, of the entered data. It is understood, however, that a written ink copy of the handwriting input may not be provided in some instances, wherein the handwriting input is then just captured by the electronic writing tablet and stored in the pen-enabled computing system as an electronic copy. Examples of pen enabled computer devices include the CrossPad™ portable digital notepad by the A. T. Cross Company and the Palm Connected Organizer™ personal data assistant (PDA) by Palm, Inc.

One example of the capabilities of pen enabled computing devices is provided by U.S. Pat. No. 5,629,499 to Flickinger et al., the contents of which are incorporated by reference herein. Flickinger describes an electronic board used to capture and store electronic ink data. According to Flickinger, a page having a writing surface is secured to the electronic board with clip. Pen input data is then entered by writing on the writing surface with a pen, wherein the writing is electronically captured by the board to create an electronic ink copy thereof. However, the electronic board is described by Flickinger as only being capable of recording pen input data for subsequent transfer of the pen input data to a processing device. Thus, there exists a need for a pen enabled computing device having the innate capability to process or otherwise manipulate recorded pen input data without having to transfer or otherwise interface with a separate or external processing device.

The Flickinger electronic board is also described as being usable with a blank piece of paper or a preprinted form, wherein a user-initiated operation indicates to the board that a page has been positioned thereon. A subsequent operation is then required to identify the page to the board. In one embodiment, the user must activate a switch outside the writing area to identify the page. However, having a separate switch for indicating each type of form supported by the device limits the capabilities and form type capacity thereof while disadvantageously adding components to the device. Further, a toggle switch requiring multiple actuations in order to scroll through the list of form types supported by the device may be inconvenient and may also limit the capacity of the device. Thus, there exists a further need for a pen enabled computing device having the capability to detect the presence of a page engaged with the device and to determine the type of form with a minimum of separate identification devices and required user-initiated operations.

Another embodiment of Flickinger describes a bar code imprinted on the back of the page, opposite to the writing surface, wherein the bar code indicates the form identity. A complementary bar code reader is then provided on the electronic board to read the bar code and identify the form. However, the process of adding a bar code to each page used with the device undesirably adds printing expense and complexity since the proper bar code must first be determined to identify the type of form and then a double-sided print or copy must be made such that the bar code is imprinted on the back of the page. In addition, the bar code reader disadvantageously adds components to the device. Thus, there exists a still further need for a pen enabled computing device having the capability of determining the type of form engaged therewith without requiring additional components and special modification of the form to indicate the form type to the device.

In addition, another embodiment of the Flickinger device discloses a single small printed box provided on the form that must be checked by the user with the pen to indicate the form type. Accordingly, each form has a separate box disposed in a different position about the writing surface. Once a box is checked by the user to identify the particular form being used, the identification data corresponding to the marked box must be transmitted to another computing device to identify the corresponding form type. However, having a dedicated box for each form type, with each box being disposed in a dedicated position on the writing surface, further limits the capacity of the device at the expense of the available area of the writing surface. This limitation is magnified if the form comprises multiple pages, wherein a separate box must be provided to identify each page of the form. In addition, this form type indicating system does not provide for the identification of multiple pages of a single form type. Thus, there exists yet a further need for a method of identifying a form to a pen enabled computing device that is capable of indicating form type while also uniquely identifying forms having multiple pages as well as multiple pages of a single form type and while occupying minimal space on the writing surface of the page. In some instances, it may be desirable for the pen enabled computing device to be capable of identifying the form without requiring dedicated identification boxes on the writing surface which must be specifically checked by the user.

Flickinger further discloses a device capable of receiving and storing pen input data which is then subsequently processed by a separate computing device. This device limitation may undesirably affect portability and the size of the device. Also, the combination of a remote processing device and a simple form identification process does not provide the capability for identifying a specific page on which future revisions or additions to the entered data can be expediently and efficiently performed by way of the corresponding form on the electronic board. The Flickinger form identification process has a further limitation in that accessing of previously stored data is limited to a general form type and does not allow the user to access a more focused data set such as, for example, data input into a specific field on a specific page of a certain type of form. More generally, Flickinger's inability to specifically identify the page being used with the electronic board may preclude a wide range of data manipulation processes that depend on the specificity and focus of a data set that can be sorted by a specific page identifier. Thus, there exists a need for a pen enabled computing device capable of specifically identifying the page being used therewith in order to facilitate future data modification, access, and manipulation in an efficient and expedient manner to provide "seamless" operation with minimal inconvenience and enhanced flexibility for the user.

Thus, there exists a need for a pen enabled computing device having the innate capability to process or otherwise manipulate recorded pen input data. It may also be desirable for the pen enabled computing device to have the capability of detecting the presence of a page engaged with the device and to determine the type of form with a minimum of separate identification devices and required user-initiated operations. Still further, the pen enabled computing device should have the capability of determining the type of form engaged therewith without requiring additional components and special modification of the form to indicate the form type to the device. In addition, it would be desirable to have an associated method of identifying a form to a pen enabled computing device that is capable of indicating form type as well as uniquely identifying forms having multiple pages and multiple pages of a single form type, while occupying minimal space, if any, on the writing surface of the page. In some instances, it may also be desirable for the pen enabled computing device to be capable of identifying the form without requiring dedicated identification boxes on the writing surface which must be specifically checked by the user. Thus, there exists a need for a pen enabled computing device capable of specifically identifying the page being used therewith in order to facilitate future data modification, access, and manipulation in an efficient and expedient manner to provide "seamless" and automatic operation with minimal inconvenience and enhanced flexibility for the user.

SUMMARY

The above and other needs are met by the present invention which, in one embodiment, provides a system for identifying a preprinted form and interacting therewith. The system comprises a pen enabled computing device having a writing stylus, a preprinted form, and a computer program product. The preprinted form is cooperable with the pen enabled computing device and comprises a page having a writing surface, a visual form identifier disposed on the writing surface and adapted to identify the nature of the page to the user, and a plurality of fields defined by the writing surface. The computer program product executes within the pen enabled computing device and cooperates therewith to determine the disposition of the writing stylus adjacent to the writing surface in order to actuate the pen enabled computing device. Subsequently, the pen enabled computing device is capable of detecting, capturing, and storing data input into the fields according to the nature of the page, wherein the nature of the page comprises a function and a specific identity. The nature of the page is also identifiable by the pen enabled computing device based on the data input into a plurality of the fields on the writing surface.

In some instances, the system further comprises an electronic handwriting tablet capable of interacting with a pen enabled computing device and the preprinted form so as to sense the position and movement of the writing stylus with respect to a page engaged with the handwriting tablet. In addition, the preprinted form may comprise a plurality of pages having a predetermined order such that a function and a specific identity may be determined for each page according to the order. To facilitate determination of the nature of the page, the fields may have predetermined spatial arrangement on the writing surface according to the nature of the page such that the pen enabled computing device detects and captures data input in a plurality of the fields to determine the nature of the page. Alternatively, data may be input into each of a plurality of the fields, wherein the pen enabled computing device and the computer program product cooperate to process the data-containing fields to define a corresponding base n number that uniquely identifies the nature of the page to the pen enabled computing device. For example, the pen enabled computing device may be configured to cooperate with the computer program product to define a base n number corresponding to a transposable matrix having n rows and m+1 columns, thereby forming an $(n)*(m+1)$ matrix elements with each element corresponding to a field on the writing surface. Each matrix element thereby has a value corresponding to the $j*n^i$, wherein i may vary from 0 to m and j varies from 0 to n−1. Therefore, the base n number may be, for example, the summation of the values of all of the elements within the matrix corresponding to field on the writing surface in which the user entered data. Once the nature of the page is determined, the pen enabled computing device may be further configured to enable access to other data stored therein that is associated with the specific identity of the page.

Once the nature of the page has been identified by the pen enabled computing device, data stored therein that is associated with and/or independent of the specific identity of the page may be accessed. In some instances, the data may be provided to the user via a user interface. Still further, after the nature of the page has been determined, the pen enabled computing device cooperates with the computer program product to determine whether data input into the fields continues to correspond to the determined nature of the page. The pen enabled computing device accordingly indicates an error if the input data fails to correspond. If an error is indicated, the error is indicated to the user via the user interface. As such, the user may thereafter be prompted to correct the error through the pen enabled computing device. In some instances, the user interface is further capable of indicating to the user the fields containing data, the data contained within the data-containing fields, and/or the number of fields containing data.

The computer program product generally cooperates with the pen enabled computing device to detect, capture, and store handwritten data input into a field with the writing stylus. The handwritten data are then spatially segmented such that the spatial segments correlate with the nature of the page. In some instances, the computer program product is further capable of assigning a stamp to data input into a field, wherein the stamp corresponds to the nature of the page and may comprise a time, a date, and/or a unique identifier. Thus, in some cases, the nature of a page may comprise a function, a specific identity, and a stamp.

The pen enabled computing device may further comprise an editing actuator, wherein the computer program product is capable of cooperating with the pen enabled computing device to edit the data upon actuation of the editing actuator. When the editing actuator is actuated, the computer program product may cooperate with the pen enabled computing device to allow the addition of data to data contained within a field, to allow insertion of data between data elements contained within a field, to allow deletion of data contained within field, and/or to allow replacement of data contained within field with alternate data. The computer program product may also be capable of determining whether data is being input into a data-containing field having a preassigned stamp. If this is the case, the user is prompted, through the user interface, to verify that the user intends to edit the data within the data-containing field.

For further manipulation of data, the computer program product may be capable of cooperating with the pen enabled computing device to allow the exportation of data or importation of data in relation to an external computing device or within either of the pen enabled computing device and the external computing device. In such instances, the computer program product may be capable of reconciling the transmission of data corresponding to the nature of a page between the pen enabled computing device and the external computing device, within the pen enabled computing device, and/or within the external computing device. In such a system, the computer program product is capable of allowing the pen enabled computing device and/or the external computing device to access data corresponding to the nature of the page and to examine and otherwise manipulate data contained within the fields thereof. In some instances, the pen enabled computing device may cooperate with the computer program product to selectively direct data contained within a field to be converted into text by the pen enabled computing device and/or the external computing device upon actuation of a conversion actuator. Still more generally, the system may be capable of selectively converting data contained within a field into text.

Another aspect of the present invention comprises a computer program product adapted to execute within a pen enabled computing device having a writing stylus and to identify the nature of a preprinted form to the pen enabled computing device, wherein the form comprises a page having a writing surface defining a plurality of fields and the nature of the page comprises a function and a specific identity. The computer program product generally comprises a number of executable portions executing within the pen enabled computing device. More specifically, the computer program product may comprise a first executable portion for determining the disposition of the writing stylus adjacent to the writing surface such that the writing stylus is capable of interacting with the fields in order to actuate the pen enabled computing device. A second executable portion directs the pen enabled computing device to detect, capture, and store data input into the fields with the writing stylus, wherein the data is input according to the nature of the page. A third executable portion identifies the nature of the page to the pen enabled computing device based upon data input into a plurality of the fields.

In some instances, the computer program product is adapted to facilitate interaction between the pen enabled computing device and an electronic handwriting tablet capable of sensing position and movement of the writing stylus with respect to a page engaged therewith. Where the form comprises a plurality of pages having a predetermined order, the computer program product may further comprise a fifth executable portion for determining a function and a specific identity for each page according to the order. Further, the fields may have a predetermined spatial arrangement on the writing surface according to the nature of the page such that the second executable portion of the computer program product detects and captures data input in a plurality of the fields to enable the pen enabled computing device to determine the nature of the page. Alternatively, data may be input into each of a plurality of the fields, wherein the computer program product then processes the data-containing fields to define a corresponding base n number that uniquely identifies the nature of the page to the pen enabled computing device. For example, the pen enabled computing device may be configured to cooperate with the computer program product to define a base n number corresponding to a transposable matrix having n rows and m+1 columns, thereby forming an (n)*(m+1) matrix elements with each element corresponding to a field on the writing surface. Each matrix element thereby has a value corresponding to the $j*n^i$, wherein i may vary from 0 to m and j varies from 0 to n−1. Therefore, the base n number may be, for example, the summation of the values of all of the elements within the matrix corresponding to field on the writing surface in which the user entered data.

After the nature of the page has been determined, the fourth executable portion may also access data stored within the pen enabled computing device, wherein the data may be with and/or be independent of the specific identity of the page. Where the pen enabled computing device further comprises a user interface, the computer program product further comprises a sixth executable portion adapted to cooperate with the user interface to provide data to the user. The computer program product may also comprise a seventh executable portion for determining whether data input into the fields continues to correspond to the determined nature of the page and indicating an error if the input data fails to correspond. In instances where an error is indicated to the user through the user interface, the seventh executable portion may also prompt the user to correct the error through the pen enabled computing device. In other instances, the seventh executable portion may be capable of indicating to the user through the user interface the fields containing data, the data contained within the data-containing fields, and/or the number of fields containing data.

Further, the second executable portion of the computer program product may detect, capture, and store handwritten data input into a field with the writing stylus by spatially segmenting the handwritten data and correlating the spatial segments with the nature of the page. In some instances, the computer program product may further comprise an eighth executable portion for assigning a stamp to data input into a field, wherein the stamp corresponds to the nature of the page and may comprise a time, a date, and/or a unique identifier.

Once a page is sufficiently identifiable, such as by a function, specific identity, and/or stamp, the data may be accessed and otherwise manipulated. In some instances, the pen enabled computing device may comprise an editing actuator, wherein the computer program product further comprises a ninth executable portion for enabling editing of data upon actuation of the editing actuator. The ninth executable portion may also be capable of adding data to data contained within a field, inserting data between previous data elements contained within a field, deleting data contained within a field, and/or replacing data contained within a field with alternate data. Also, the computer program product may further comprise a tenth executable portion capable of determining whether data is being input into a data-containing field having a preassigned stamp and, if so, prompting the user, through the user interface, to verify that the user intends to edit the data within the field.

The computer program product may further comprise an eleventh executable portion capable of exporting data to and/or importing data in relation to an external computing device or within either the pen enabled computing device or the external computing device. The eleventh executable portion may be capable of reconciling transmission of data corresponding to the nature of the page between the pen enabled computing device and the external computing device, within the pen enabled computing device, and/or within the external computing device. The computer program product may further comprise a twelfth executable portion capable of allowing the pen enabled computing device and/or the external computing device to access data corresponding to the nature of a page and to examine and otherwise manipulate data contained within the fields thereof. In some instances, the pen enabled computing device may further comprise a conversion actuator, wherein the computer program product also further comprises a thirteenth executable portion that is capable of selectively directing data contained within a field to be converted into text by the pen enabled computing device and/or the external computing device upon actuation of the conversion actuator. Still more generally, the computer program product may further comprise a fourteenth executable portion capable of selectively converting data contained with a field into text.

Yet another aspect of the present invention comprises a pen enabled computing device adapted for use with a preprinted form, the preprinted form comprising a page having a writing surface, a visual form identifier disposed on the writing surface and adapted to identify the nature of the page to a user, and a plurality of fields defined by the writing surface and arranged to correspond to the nature of the page, further wherein the nature of the page generally comprises a function and a specific identity. Such a pen enabled computing device comprises a writing stylus and a sensing device, wherein the sensing device is adapted to engage the preprinted form and cooperates with the writing stylus such that the pen enabled computing device is actuated when the writing stylus is disposed adjacent to the writing surface in interactable relation with the fields, thereby enabling the pen enabled computing device to determine the nature of the page as data is input into the fields with the writing stylus according to the user-identified nature of the page.

The sensing device may comprise an electronic handwriting tablet adapted to engage the preprinted form and capable of sensing position and movement of the writing stylus with respect to the page. In some instances, the pen enabled computing device may be configured to be capable of determining the nature of a form comprising a plurality of pages having a predetermined order where each page has a function and specific identity corresponding to the order. In order to determine the nature of the page, the pen enabled computing device may be configured to require data to be input into a plurality of the fields in order to determine the nature of the page therefrom, wherein the fields have a predetermined spatial arrangement on the writing surface according to the nature of the page. Alternatively, the pen enabled computing device may be configured to define a base n number that uniquely identifies the nature of the page from the data input into each of a plurality of the fields. For example, the pen enabled computing device may be configured to cooperate with the computer program product to define a base n number corresponding to a transposable matrix having n rows and m+1 columns, thereby forming an (n)*(m+1) matrix elements with each element corresponding to a field on the writing surface. Each matrix element thereby has a value corresponding to the $j*n^i$, wherein i may vary from 0 to m and j varies from 0 to n−1. Therefore, the base n number may be, for example, the summation of the values of all of the elements within the matrix corresponding to field on the writing surface in which the user entered data. Once the nature of the page is determined, the pen enabled computing device may be further configured to enable access to other data stored therein that is associated with the specific identity of the page.

A still further aspect of the present invention comprises a method for identifying the nature of a page of a preprinted form with a pen enabled computing device having a writing stylus and interacting therewith. Generally, the nature of the page comprises a function and a specific identity, wherein the page further has a writing surface, a visual form identifier disposed on the writing surface and adapted to identify the nature of the page to a user, and a plurality of fields defined by the writing surface. Such a method comprises determining the disposition of the writing stylus adjacent to the writing surface such that the writing stylus is capable of interacting with the fields and actuating the pen enabled computing device, receiving data into the fields via the writing stylus and according to the nature of the page, determining the nature of the page from a plurality of the fields in which data is received, and identifying the nature of the page to the pen enabled computing device.

In some instances, the method may further comprise allowing access to other data stored within the pen enabled computing system, wherein the data may be associated with and/or independent of the specific identity of the page. Where the form comprises a plurality of pages having a predetermined order, the method may also further comprise determining a function and specific identity for each page corresponding to the order. In some cases, the fields may be defined by the writing surface according to a predetermined spatial arrangement, wherein the method then further comprises determining the nature of the page from the spatial arrangement of the plurality of the fields in which data is received. Alternatively, the method may comprise determining the nature of the page from a plurality of the fields in which data is received, wherein the data input into each of the plurality of the fields is processed to define a base n number uniquely corresponding to the nature of the page. Accordingly, the input data may be determined by sensing the position and movement of a writing stylus with respect to a page with an electronic handwriting tablet engaged with the page.

The method may also comprise providing data to the user via a user interface, wherein the user interface is cooperable with the pen enabled computing device. After the nature of the page has been identified to the pen enabled computing device, the method may also comprise determining whether data input into the fields continues to correspond to the determined nature of the page and indicating an error if the input data fails to correspond. In such instances, the method may further comprise indicating an error to the user through the user interface and prompting the user to correct the error using the pen enabled computing device. The user interface may also be configured such that the method may further comprise indicating to the user the fields containing data, the data contained within the data-containing fields, and/or the number of fields containing data.

In addition, the method may comprise detecting, capturing, and storing handwritten data input into a field with the writing stylus by spatially segmenting the handwritten data and correlating the spatial segments with the nature of the page. In some instances, the method may also comprise assigning a stamp to data input into a field, wherein the stamp corresponds to the nature of the page and comprises a time, a date, and/or a unique identifier. Where data may be edited, the method may further comprise actuating an editing actuator in order to enable the pen enabled computing device to edit the data. After actuating the editing actuator, the pen enabled computing device may also be enabled to add data to data contained within a field, insert data between data elements contained within a field, delete data contained within a field, and replace data contained within a field with alternate data. In some instances, the method may further comprise determining whether data is being input into a data-containing field having a preassigned stamp and, if so, prompting the user through the user interface to verify that the user intends to edit the data within the field.

Still further, detecting the position and movement of the writing stylus may further comprise sampling the motion of the writing stylus with respect to the writing surface so as form a coordinate representation of each stroke of the handwritten input. In some instances, editing the handwritten input may comprise receiving an indication from a user that the handwritten input is to be edited and receiving textual input from a keyboard to form the textual data with which the handwritten input is edited. Accordingly, editing the handwritten input may further comprise altering the coordinate representation of at least some strokes of the handwritten input in order to alter spacing of the at least one bounding box so as to insert the textual input between adjacent bounding boxes and/or replace a bounding box containing handwritten input with the textual input.

Yet another advantageous aspect of the present invention comprises a method for converting handwriting into a machine-usable format using a pen enabled computing device having a writing surface and a writing stylus selectively communicable with the writing surface. First, the position and movement of the writing stylus with respect to the writing surface is detected by the pen enabled computing device to form a handwritten input. Bounding boxes are then defined around each stroke of the handwritten input. The handwritten input and the bounding boxes are then stored in a machine-usable format, thereby allowing the handwritten input to be edited by adding textual data to the handwritten input, inserting textual data between adjacent bounding boxes, deleting at least one bounding box, and replacing at least one bounding box with alternate data.

Still further, detecting the position and movement of the writing stylus may further comprise sampling the motion of the writing stylus with respect to the writing surface so as form a coordinate representation of each stroke of the handwritten input. In some instances, editing the handwritten input may comprise receiving an indication from a user that the handwritten input is to be edited and receiving textual input from a keyboard to form the textual data with which the handwritten input is edited. Accordingly, editing the handwritten input may further comprise altering the coordinate representation of at least some strokes of the handwritten input in order to alter spacing of the at least one bounding box so as to insert the textual input between adjacent bounding boxes and/or replace a bounding box containing handwritten input with the textual input.

Yet still another advantageous aspect of the present invention comprises a system for converting handwriting into a machine-usable format, wherein the system comprises a pen enabled computing device having a memory element, a writing surface, and a writing stylus selectively communicable with the writing surface. The system may also comprise a computer program product executing within the pen enabled computing device and cooperating therewith for detecting the position and movement of the writing stylus with respect to the writing surface to form a handwritten input, defining a bounding box about each stroke of the handwritten input, storing the handwritten input and the bounding box surrounding each stroke in the memory element in a machine-usable format, and editing the at least one handwritten element to add textual data to the handwritten input, insert textual data between adjacent bounding boxes, delete at least one bounding box, and/or replace at least one bounding box with alternate data.

According to some embodiments, the computer program product may sample the motion of the writing stylus with respect to the writing surface so as to form a coordinate representation of each stroke of the handwritten input. Further, the pen enabled computing device may cooperate with the computer program product to receive an indication from a user of the handwritten input to be edited and also receive textual input from a keyboard to form the data with which the handwritten input is edited. Accordingly, the computer program product edits the handwritten input by altering the coordinate representation of at least some strokes of the handwritten input in order to alter spacing of the at least one bounding box so as to insert the textual input between adjacent bounding boxes and/or replace a bounding box containing a handwritten element with the textual input.

Thus, embodiments of the present invention provide a pen enabled computing device having the innate capability of processing or otherwise manipulating recorded pen input data. Embodiments of the present invention also provide a pen enabled computing device having the capability of detecting the presence of a page engaged with the device and determining the type of form with a minimum of separate identification devices and required user-initiated operations. According to a particularly advantageous aspect, the user uses the form according to its identified function and does not otherwise have to independently indicate the nature of the form to the pen enabled computing device. Accordingly, embodiments of the present invention provide a pen enabled computing device having the capability of determining the type of form engaged therewith without requiring additional components or special modification of the form to indicate the type of form to the device. Embodiments of the present invention also provide an associated method of identifying a form to a pen enabled computing device, while indicating the type of form as well as uniquely identifying forms having multiple pages and multiple pages of a single type of form. Advantageously, such a method accomplishes the identification of the page to the pen enabled computing system while occupying minimal, if any, space on the writing surface of the page. Thus, embodiments of the present invention provide a pen enabled computing device capable of specifically identifying the page being used therewith in order to facilitate future data modification, access, and manipulation in an efficient and expedient manner to provide enhanced seamless and automatic operation with minimal inconvenience and enhanced flexibility for the user.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which:

FIG. 4 is an example of a daily schedule form in accordance with one embodiment of the present invention.

FIG. 5 is an example of a to-do list form in accordance with one embodiment of the present invention.

FIG. 6 is an example of a notes form in accordance with one embodiment of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
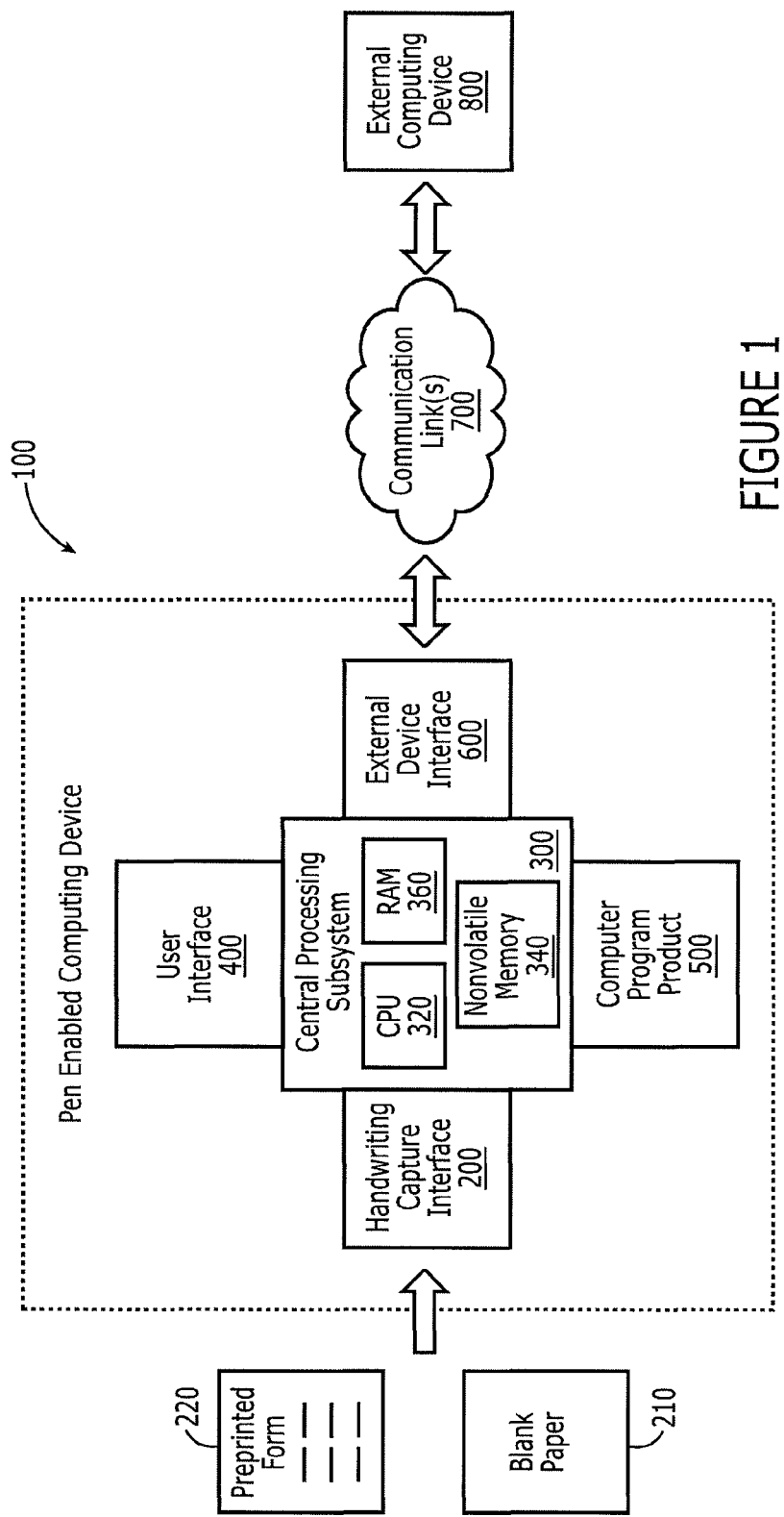
FIG. 1 is a schematic of a pen enabled computing system according to one embodiment of the present invention.

FIG. 1 is a schematic of a system for identifying a form and manipulating associated information with a pen-enabled computing device according to one embodiment of the present invention, the device being indicated generally by the numeral 100. The device 100 generally comprises a handwriting capture interface 200, a central processing subsystem 300, a user interface 400, a computer program product 500, and an external device interface 600. The handwriting capture interface 200 generally comprises an apparatus for sensing the movements of a writing stylus. In this regard, the handwriting capture interface typically provides a digitized output that defines a number of (x,y) coordinate pairs, each of which defines a mark made by the writing stylus upon a writing surface. The writing stylus is typically a writing instrument which may be capable of creating visible marks upon a writing surface such as, for example, a blank of piece of paper 210 or a paper-based preprinted form 220. In a particularly advantageous embodiment of the present invention, the handwriting capture interface 200 comprises a writing stylus and an electronic handwriting tablet area. The stylus and the handwriting tablet are interfaced such that the position or motion of the writing stylus, corresponding to writing strokes, with respect to the handwriting tablet can be detected and captured by the device 100. The stylus may interact with the handwriting tablet such that the position or motion of the stylus is detected when proximate to the tablet or, alternatively, in contact with the handwriting tablet through a writing surface, wherein the writing surface may comprise, for example, the paper 210 or form 220, a multiplicity thereof, or a surface integral with the handwriting tablet. In some instances, a handwriting tablet may not be necessary if the position and motion of the writing stylus may be directly detected by the handwriting capture interface 200 or other components of the device 100.

At least partially driving the handwriting capture interface 200 is the central processing subsystem 300. The central processing subsystem 300 may comprise, for example, a central processor unit 320, non-volatile memory storage 340, and RAM storage 360. The central processing unit (CPU) 320 is generally capable of executing all computer processing activities required to support the device 100. Non-volatile memory resources 340 such as, for example, an EEPROM or a disk, are typically used for storing and/or executing a computer program product 500 as well as storing useful data such as, for example, electronic ink. Further, the RAM storage 360 is used for loading and executing the computer program product 500.

The user interface 400 includes provisions for facilitating interaction between the device 100 and a user. The user interface 400 may comprise, for example, one or more buttons for initiating functions within the device 100 where, in some instances, the buttons may comprise a part of a keyboard or a keypad. The user interface 400 may also comprise an apparatus for allowing the user to view displayed data or status information such as, for example, a viewing screen or monitor. In some instances, the user interface 400 may also include an audio mechanism such as, for example, a buzzer, bell, or other indicator or other devices capable of supporting voice interaction between the device 100 and the user. Still further, for example, a vibration mechanism may also be used as an alert or acknowledgement indicator. Accordingly, the user interface 400 may be implemented in many different manners, combinations thereof, and/or in conjunction with different components of the device 100.

The computer program product 500 generally cooperates with the central processing subsystem 300 to control the device 100. The computer program product 500 further drives the handwriting capture interface 200 to interface and cooperate with a writing surface. According to one embodiment, the computer program product 500 enables the device 100 to, for example, sense a plurality of fields associated with the paper 210 or the preprinted form 220, wherein the function and specific identity thereof may then be electronically identified to the device 100. The function and specific identity of the form may also be referred to herein as comprising the nature of the form. While the handwriting capture interface 200 may be implemented with, for example, a piece of paper 210, a form 220, or a surface integral with the interface 200, reference to the handwriting capture interface 200 will be made herein to an embodiment of the invention having a form 220 interacting therewith. It will be understood, however, that this reference is for illustration only and such reference may include embodiments, otherwise mentioned herein as examples, as well as other configurations of a handwriting capture device consistent with the spirit and scope of the present invention.

Once the device 100 interfaces with the form 220 based upon the identified function and specific identity thereof, the system is then able to act upon data entered in the fields associated with the form, the data comprising, for example, a handwriting input. In one advantageous embodiment of the present invention, the handwriting input is captured and stored by the computer program product 500 as a coordinate representation of the interaction of the writing stylus with the handwriting tablet. In particular, the handwriting capture interface provides a plurality of (x,y) coordinate pairs representative to respective marks made by the writing stylus upon the handwriting tablet. As described hereinafter, the central processing subsystem defines a bounding box around the (x,y) coordinate pairs that cumulatively represent a particular stroke. In this context, a stroke is generally defined as a continuous marking by the writing stylus beginning with the commencement of contact or other interaction between the writing stylus and the handwriting tablet and terminating with the removal of the writing stylus from the handwriting tablet. For example, a "c" is generally formed of one stroke, while a "t" is generally formed of two strokes. Once the nature of the form is determined from the input data, the computer program product 500 is capable of accessing other data that is associated and/or not associated with the specific identity of the form. In some instances, the data in the fields may also be altered or otherwise manipulated by the user. The computer program product 500 may further have the ability to stamp any data entries as they are entered into the system 100 with, for example, a time, a date, and/or another unique identifier. The device 100 is then able to process these data fields with respect to the stamp. As these functions are executed, the computer program product 500 also controls the user interface 400 such that information relevant to ongoing stylus or device 100 activities are displayed for the user. In one advantageous embodiment, the computer program product 500 may be capable of formatting, sending, receiving, reconciling, and interpreting messages flowing through the external device interface 600. The computer program product 500 is described in more detail herein.

The external device interface 600 is in communication with the central processing subsystem 300 and enables the device 100 to communicate with external computing devices in a unidirectional or bidirectional manner. Generally, the communication is accomplished via a communications link 700 to an external computing device 800. Accordingly, the external device interface 600 may be generic in terms of protocol and communication medium as is known to one skilled in the art. The communications link between the device 100 and the external computing device 800 may be either direct or indirect connections via wireline or wireless devices. The communications link 700 may comprise a variety of external communications links as well as a combination of these links such as, for example, wired serial interfaces, wired parallel interfaces, wireline modems, wireless modems, LAN connections, and WAN connections.

Figure 2:
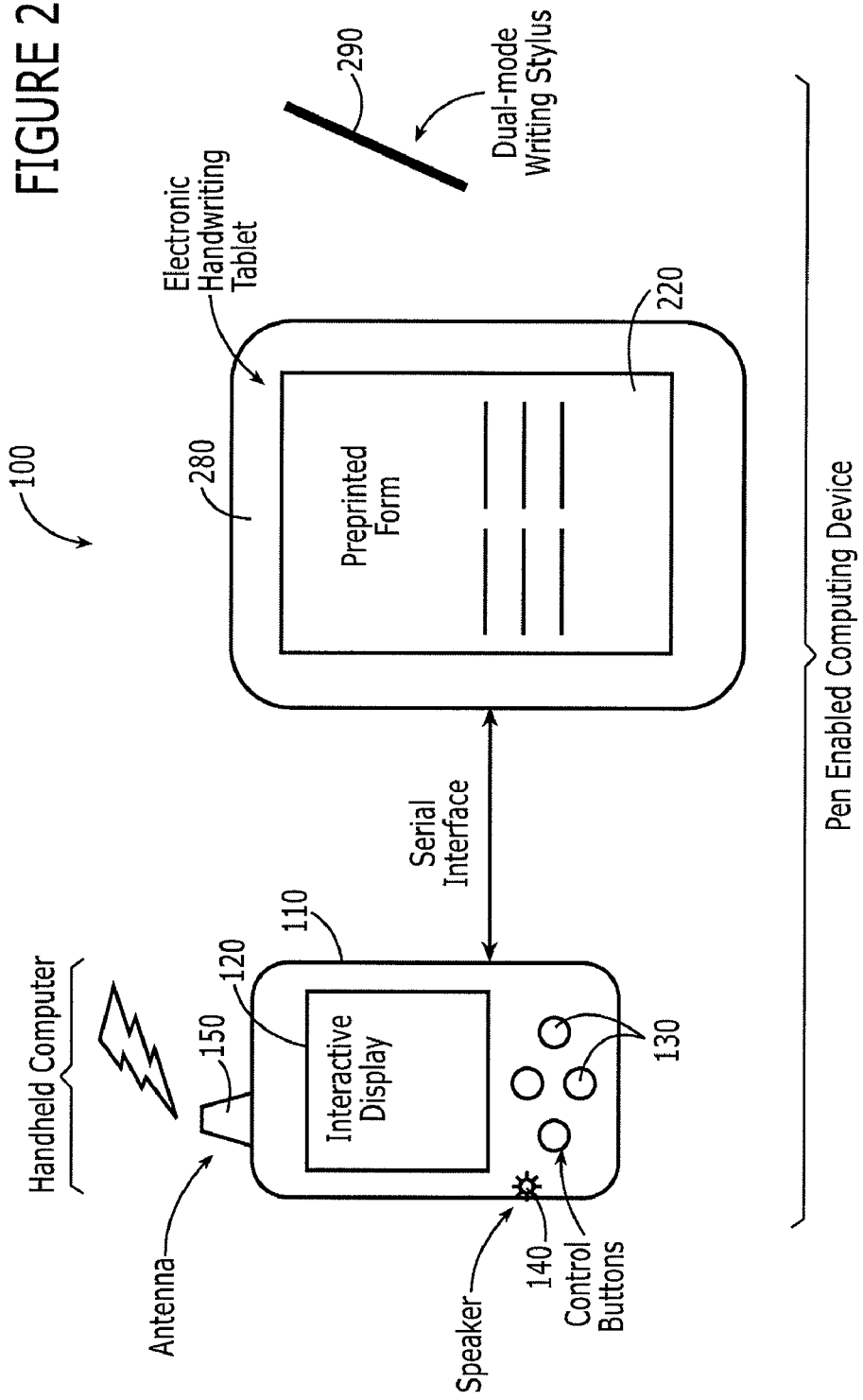
FIG. 2 is a schematic of a pen enabled computing device according to one embodiment of the present invention.

One advantageous embodiment of a pen-enabled computing device 100 according to the present invention is shown in FIG. 2. A handheld computer component 110 such as, for example, a modified personal digital assistant (PDA) or a smart-phone provides most of the functionality of the device 100. Accordingly, the handheld computer component 110 comprises the central processing subsystem 300, the user interface 400, the computer software program product 500, and the external device interface 600 as shown in FIG. 1. The user interface 400 may include an interactive display 120, one or more control buttons 130, and a speaker 140. The external communications interface 600 may include a wireless transceiver (not shown) and an antenna 150. In addition, the handwriting capture interface 200 comprises an electronic handwriting tablet 230 that may be co-operable with, for example, a blank piece of paper 210 or a paper-based preprinted form 220. The electronic handwriting tablet 280 may be serially interfaced with the handheld computer component 110. A dual-mode writing stylus 290 is employed by the user to form visible marks on the paper-based preprinted form 220, wherein the motion and position of the writing stylus 290 are also detectable by the electronic handwriting tablet 280.

A pen-enabled computing device 100 according to the present invention may comprise many different combinations of components than the embodiment previously described. For example, an electronic handwriting tablet may be combined with a desktop personal computer, wherein the electronic handwriting tablet and the personal computer are physically connected via a wired interface and the personal computer is connected to a local area network (LAN). As another example, an electronic handwriting tablet may be combined with a laptop personal computer and a central server, wherein the electronic handwriting tablet and the personal computer are connected via a wireless interface and the personal computer has a network connection to the central server via a LAN. The central server is further capable of communicating with various application servers. Thus, a pen-enabled computing device may be accomplished in many different manners consistent with the spirit and scope of the present invention.

Figure 3:
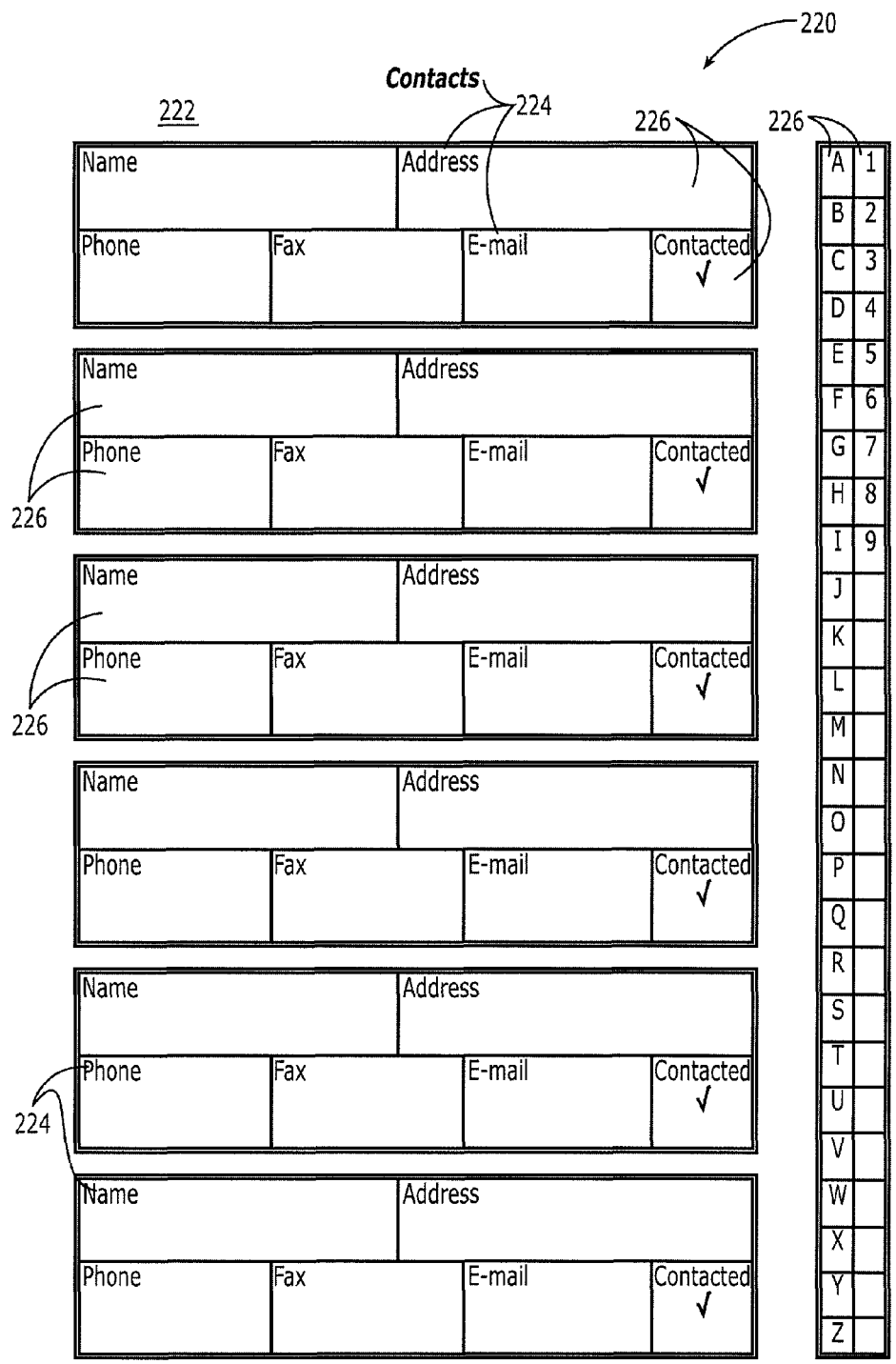
FIG. 3 is an example of a contacts form in accordance with one embodiment of the present invention.
Figure 6:
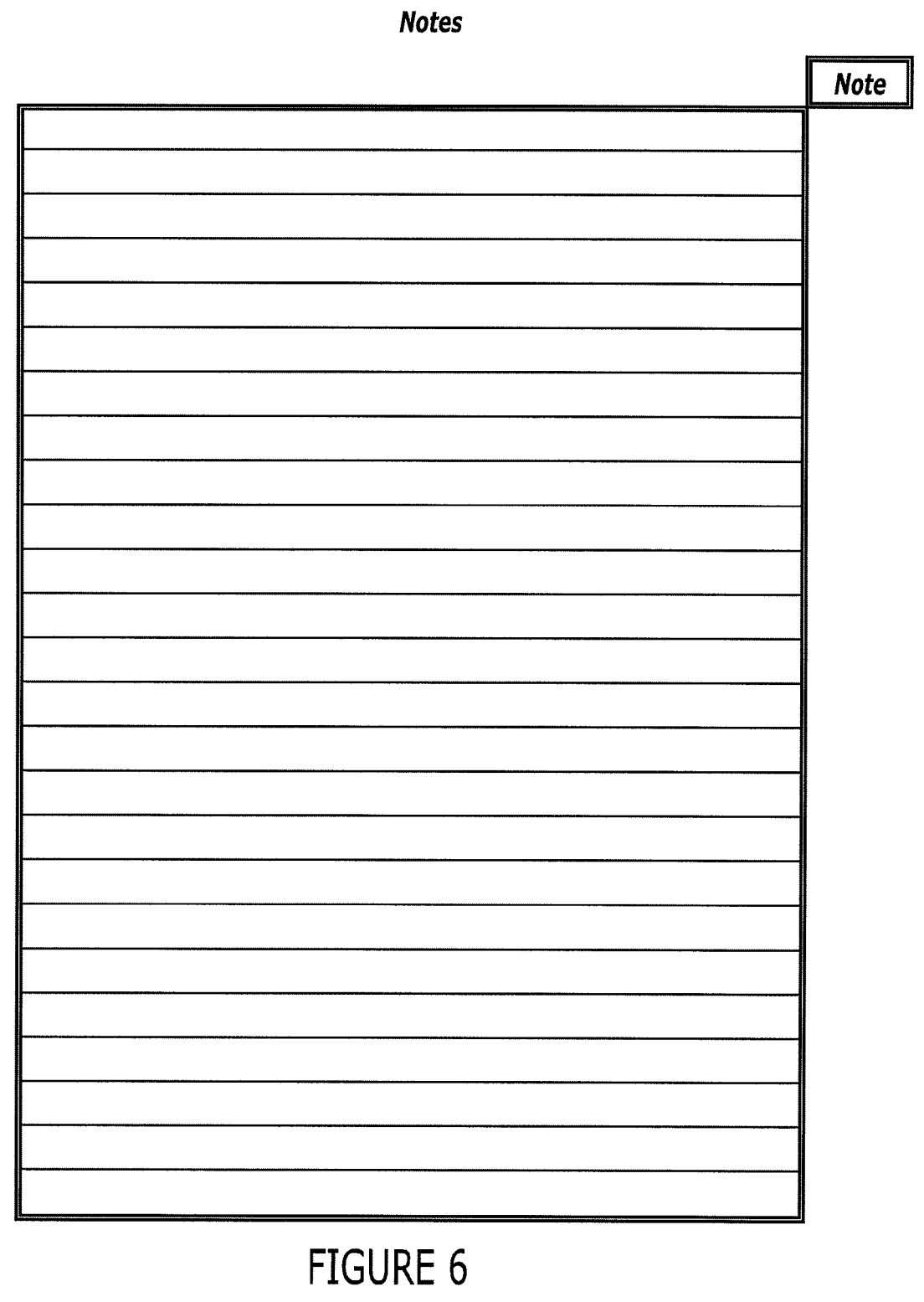

In accordance with embodiments of the present invention, one purpose of the pen enabled computing device is to identify the nature of a form 220 engaged therewith. Several examples of forms are shown in FIGS. 3-6, wherein such forms 220 may include a contact list form as shown in FIG. 3, a calendar form as shown in FIG. 4, a to-do list form as shown in FIG. 5, and a general notes form as shown in FIG. 6. Other examples of forms include, for instance, a trip planner form, a memorandum form, an educational form, a training form, an insurance form, a healthcare form, an expense accounting form, and a wide variety of other forms consistent with the spirit and scope of the present invention.

As shown in FIG. 3, a particular contacts form 220 comprises a writing surface 222, at least one visual form identifier 224, and a plurality of fields 226 for receiving data via the writing stylus. The fields 226 are generally defined by a series of spatial coordinates so as to generally define a box configured to receive a data input therein corresponding to a particular function. For example, a field labeled "Address" is capable of identifying itself to a user and is expected to receive an input therein with the writing stylus corresponding to the address of a particular contact. Further, fields labeled, for example, "G" and "7" could indicate that the user wishes to store an entered record on the seventh page of all contacts having data within the "Name" field having the letter "G". Thus, for a given type of form 220, the fields 226 defined by the writing surface 222, along with the visual form identifiers 224, may combine to indicate a function of the form as well as a specific identity should the form comprise multiple pages or should there be multiple pages of one type of form.

Generally, the user interacts with the form 220 according to the user-identified function imparted by the visual form identifiers 224. The user then enters data within the separate fields according to the functions thereof. Typically, as the data is entered into a field, it is spatially referenced with respect to the box defining the field. For example, data entered into a "Name" field may be referenced to the leftmost vertical boundary or possibly a combination of the leftmost vertical boundary and the lowermost horizontal boundary. Thereafter, data entered into an "Address" field may be referenced to the leftmost vertical boundary of the address box, which also corresponds to the rightmost vertical boundary of the name field. Thus, it is understood that data entered into defined fields on a form according to the functions thereof may be spatially referenced so as to be indicative of the nature of the form 220.

FIG. 4 shows an example of a daily scheduler form 228 which also includes a writing surface 230, at least one visual form identifier 232, and a plurality of fields 234 defined by the writing surface 230. The fields 234 of the daily scheduler form 228 are spatially defined in a different manner than the previous contacts form 220 as shown in FIG. 3. Thus, the fields for indicating the month and day in the daily scheduler form 228 may fall outside any of the fields defined by the contacts form 220. Conversely, certain fields in the contacts form 220, such as the "Address" or "E-mail" fields may be spatially disposed away from the spatial reference points for the fields of the daily scheduler form 228. Thus, it will be understood that spatial representation of fields disposed on a form can also serve to differentiate between different types of forms. In order to add more specificity to the identification of a form, various fields may also be spatially disposed so as to define a unique code over other forms. For example, checking the appropriate fields on the daily scheduler form 228 for a month and day differentiates the particular form from daily scheduler forms for other days throughout the year.

As shown in FIG. 2, the pen enabled computing device 100 is particularly adapted to interact with a form 220, wherein entering data in fields on the form 220 with a writing stylus 240 provides both a written ink copy of the particular form in addition to an electronic ink copy detected, captured, and stored by the device 100. In order to facilitate future access to and other manipulation of the data entered on a particular form 220, the device 100 is configured to be capable of identifying the nature of the form 220, wherein the nature of the form comprises a function and a specific identity. According to one embodiment of the present invention, the nature of the form 220 may be defined by a code corresponding to data entered into particular fields on the form 220. On the writing surface of the form, the particular fields may be disposed and configured so as to form a unique code depending on the particular fields in which data is entered. For example, the pen enabled computing device 100 may be able to define a base n number that indicates the nature of a particular form. For example, the pen enabled computing device may be configured to cooperate with the computer program product to define a base n number corresponding to a transposable matrix having n rows and m+1 columns, thereby forming an (n)*(m+1) matrix elements with each element corresponding to a field on the writing surface. Each matrix element thereby has a value corresponding to the $j*n^i$, wherein i may vary from 0 to m and j varies from 0 to n−1. Therefore, the base n number may be, for example, the summation of the values of all of the elements within the matrix corresponding to field on the writing surface in which the user entered data. Thus, it can be seen that selecting a particular combination of matrix elements within the matrix provides a unique identifier which may be used to indicate the nature of the form and such defined coding may be appropriately scaled or otherwise altered to match the form type support capacity of the device 100. In this manner, the area occupied on the writing surface by the particular fields may be reduced or minimized since the number of fields required to produce a unique form identification code requires less area on the writing surface compared to specifically dedicated identification fields.

In addition, various other provisions can be used to enhance and/or supplement the nature of the form indicated by a particular combination of actuated fields. For example, the pen enabled computing device 100 may be configured to selectively apply a stamp to data entered within a particular field, wherein the stamp may comprise a time, a date, or some other type of unique identifier that may be further referenced by the pen enabled computing device 100. Alternatively, or in addition, the pen enabled computing device 100 may be configured so as to be capable of identifying the nature of the form based upon the spatial disposition of the fields defined by the writing surface. According to such embodiments, the pen enabled computing device 10 is capable of determining the spatial disposition of data entered on the writing surface in comparison to the spatial references for particular fields for the various forms supported by the pen enabled computing device 100. That is, fields on different forms can be staggered or otherwise uniquely positioned with respect to other forms supported by the system so that each form has a unique combination of fields that can be automatically identified by the pen enabled computing system as the user enters data in one or more of the fields. In some instances, the identification of a unique combination of fields may be sufficient to indicate the nature of the form to the device 100.

The enhanced determination of the nature of the form according to embodiments of the present invention provides further utility in that future editing of the input data is facilitated as well as future editing of the particular paper-based form. In addition, error detection and correction are also facilitated. For example, according to one embodiment of the present invention, once the nature of the page has been defined by the device 100, data entered according to a particular spatial arrangement of fields is expected by the device 100. Accordingly, should the user enter data outside the defined field boundaries, the device 100 is capable of, for example, detecting whether the user has entered data outside of an expected defined field and may apply a spatial criteria to determine whether the data has been insignificantly entered outside the boundary of the field by the user. If the entered data is determined by the device 100 to have been entered by the user outside the expected fields corresponding to the nature of the page, the device 100 may alert the user with an alarm or some other user interface device and present the user with the opportunity to resolve the aberrant data. For example, the user could be asked to identify to the device 100 the user-identified nature of the page. Alternatively, the user could be presented with the opportunity to move the aberrant data to an expected field or given the opportunity to save the aberrant data as an incidental note not associated with a particular expected field. Accordingly, it is understood that such applied criteria may facilitate a variety of possibilities for resolving the misentered data as well as other data processing operations. According to other embodiments of the present invention, detailed identification of the nature of the page facilitates the indication of data to the user as the user is interacting with the device 100. For example, upon determining the nature of the form, the device could display to the user any previous data entered into the corresponding fields, the nature of that data, or possibly the number of fields in which the data has been entered. Accordingly, the device 100 may also be able to determine whether the user is entering data in a field in which data had been previously entered. In detecting the situation, the device 100 may further be capable of alerting the user as to the presence of the previous data as well as given the user the opportunity to add to the data in the field, replace the data in the field, or abort the input of data into that particular field.

Figure 7A:
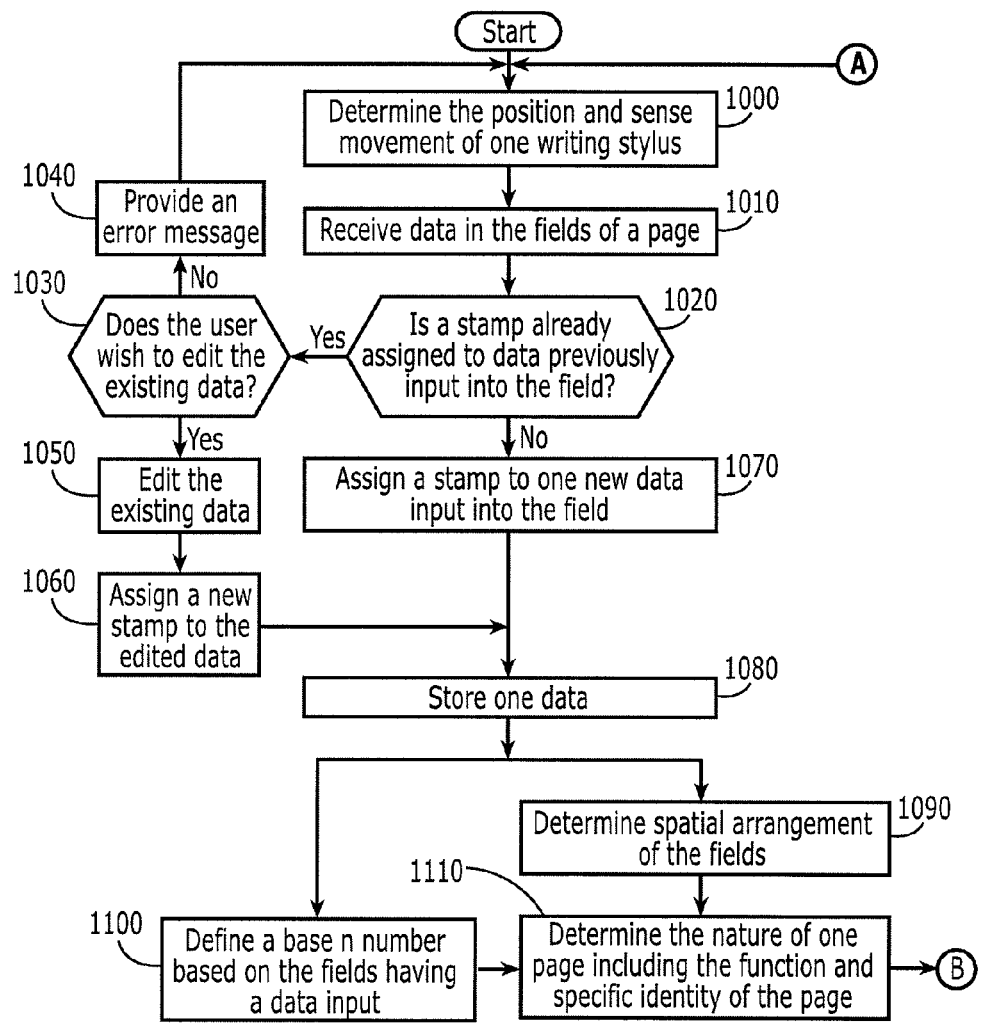
FIGS. 7 (a) and 7 (b) is a flowchart of a method of identifying a form and manipulating data associated therewith with a pen enabled computing device according to one embodiment of the present invention.
Figure 7B:
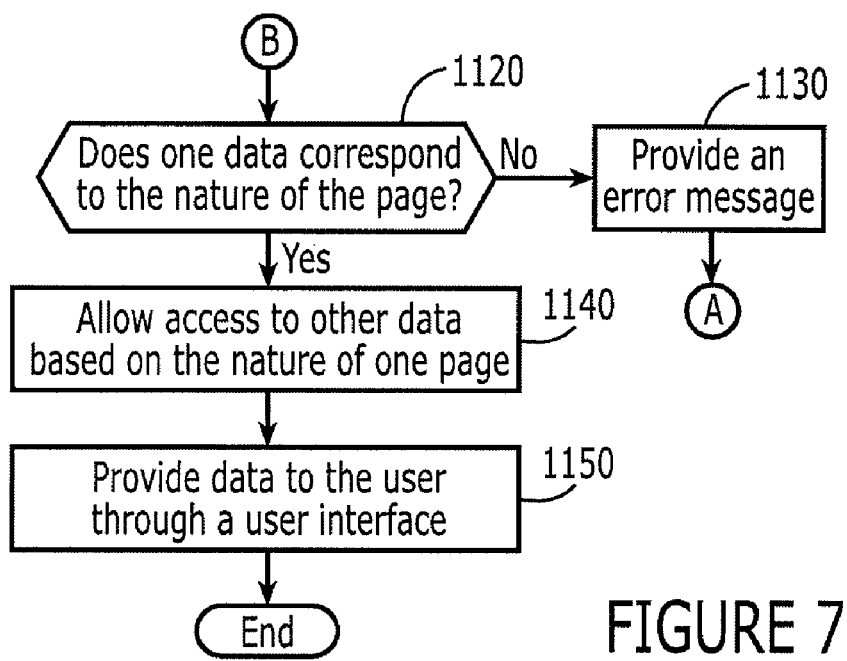

FIGS. 7A and 7B provide a flowchart of a method of identifying a form and manipulating information using a pen enabled computing device according to one embodiment of the present invention. Where the form is engaged with the pen enabled computing device 100 and the user proceeds to enter data within the fields on the writing surface, the device 100 determines the position and senses the movement of the writing stylus with respect to the writing surface (block 1000) and a text, receives, and stores the data entered into the fields of the page (block 1010). If the user is entering data into a field defined by a previous stamp, the stamp comprising a time, date, or other unique identifier (block 1020), the device 100 prompts the user to indicate whether the user wishes to proceed with editing the existing field (block 1030). If the user indicates that no editing of the current field is desired, the device 100 indicates an error message to the user (block 1040) and allows the user to select an alternate field on the writing surface or, for example, resolve a conflict in form types. However, if the user indicates that editing the entry is desired (block 1050), the device 100 allows the user to edit the data and then saves the edited data and assigns a new stamp to the field (block 1060). Alternatively, if the field had contained no previous stamp, the user would be permitted to input new data into the field which would be assigned a stamp following the completion of data entry by the user (block 1070).

After the data has been input into the field and a stamp assigned by the device 100, the data is stored by the device 100 (block 1080). Depending on a variety of factors including the configuration of the device 100 and the type of form, the device 100 may then proceed to determine the spatial arrangement of the fields in which data was entered by the user (block 1090) and/or proceed to define a base n number based on the fields having a data input (block 1100). The nature of the particular page can then be determined (block 1110) and the device 100 is then able to verify that the data entered into the selected fields corresponds to the identified nature of the page (block 1120). Should the data not correspond to the nature of the page, the device indicates an error message to the user (block 1130) and further prompts the user to select a different field or resolve the conflict between form types. However, should the data input into the fields correspond to the nature of the page, the device 100 allows access to other data based on the nature of the page (block 1140) or according to a more focused search criteria specified by the user. Further, data including the data input by the user, the data contained within fields within the form, and other data associated with the nature of the particular page may also be provided to the user through the user interface (block 1150) such that the user is able to monitor the data status and to edit or otherwise manipulate the data associated with the particular page. However, it should be noted that, once the data has been captured and stored by the device 100, that a variety of data manipulation functions are possible using the device 100 and/or an external computing device 800 according to the spirit and the scope of the present invention.

Figure 8:
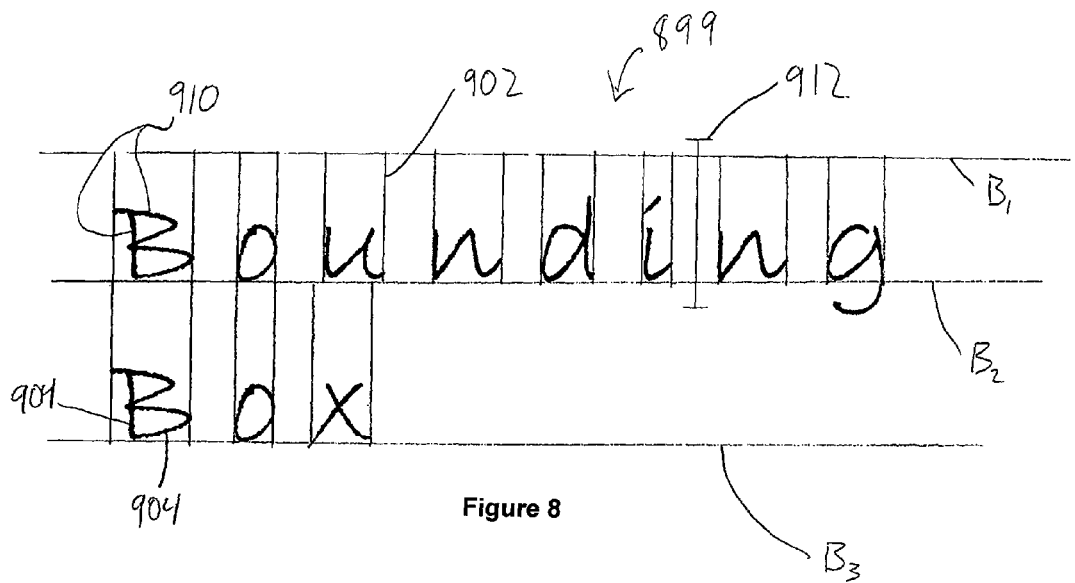
FIG. 8 is a view of a handwritten input in accordance with one example embodiment.
Figure 9:
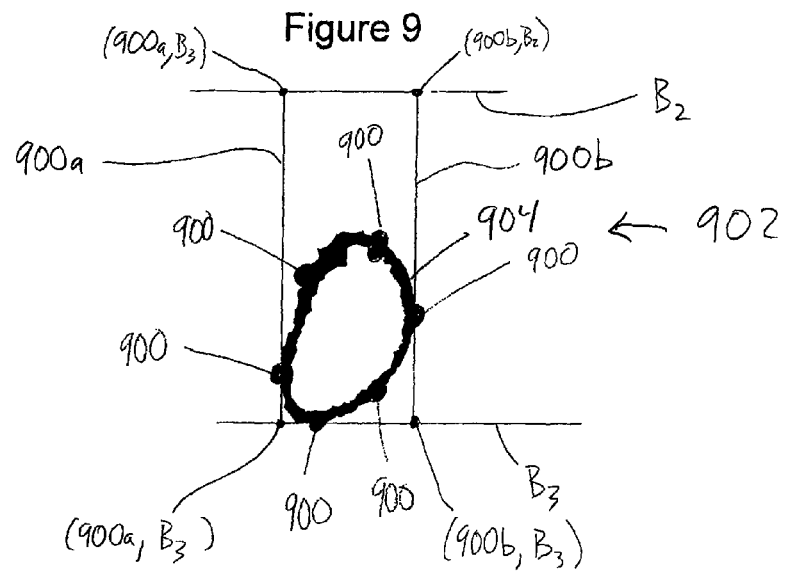
FIG. 9 is another view of the handwritten input of FIG. 8.

With reference to FIGS. 8 and 9, the present invention also provides a technique for seamlessly editing handwritten and/or textual data by means of a pen-enabled computing device 100 and a computer program product 500 executing thereon. In the embodiment in which a handwritten input 899 is to be edited, the handwritten input is initially captured by the handwriting capture interface 200 which detects the position and movement of the writing stylus 290 with respect to the writing surface 280 of the pen-enabled computing device 100. As described above, the handwriting capture interface 500 generally provides a sequence of (x,y) coordinate pairs 900 that define respective marks by the writing stylus 290 upon the writing surface 280.

The central processing unit 320 of the pen-enabled computing device 100 in conjunction with the computer program product 500 then define bounding boxes 902 around each stroke 904. Typically, each bounding box 902 is a rectangular box 902 that includes at least a portion of the (x,y) coordinate pairs 900 of the respective stroke 904 with one x coordinate of the rectangular box 902 defined by the smallest x 900a of any of the coordinate pairs 900 and another x coordinate of the rectangular box 902 at a point defined by the largest x 900b, with the y coordinates extending between successive baselines B1, B2, . . . Bn. In some instances, the bounding boxes 902 may also have included in the definitions thereof a time variable which may affect the delegation of a stroke to a particular bounding box. While a bounding box 902 is described herein in spatial terms as at least partially encompassing a single stroke 904, the boundary box 902 can be defined differently in other applications, typically based on spatial or temporal characteristics of one or more strokes 904 in order to bundle one or more strokes 904 together as a unit 910 for editing purposes.

In instances in which the handwritten input 899 is arranged in multiple lines, the central processing unit 320 in cooperation with the computer program product 500 operating thereon also determines the baseline Bn for each of the lines so as to provide a point of reference for the characters in the respective line. As known to those skilled in the art, the baseline Bn typically corresponds to the lowermost portion of most alphanumeric characters, although several letters, such as p, g and j have lower portions that fall below the baseline Bn. The baseline Bn can be determined in various manners. For example, the user of the pen-enabled computing device 100 can place the baseline Bn by dragging a baseline Bn into the proper position, by positioning a baseline Bn with repeated actuation of up and down arrow keys or any other like means. As known to those skilled in the art, baselines Bn can also be determined based upon changes in a one-dimensional histogram in which the histogram axis corresponds to the y or vertical direction of the page that the user is writing upon. In this regard, the histogram includes counts for a number of y values that define the number of strokes 904 that pass through the respective y value. Since the y values that have large counts generally correspond to lines of handwriting, a baseline Bn is typically defined immediately below y values having large counts. Finally, if a lined page is placed upon the writing surface 280 such that the page 220 is positioned in a known registration to the writing surface 280, the central processing unit 320 can define the baselines Bn in a spatial arrangement corresponding to the spatial arrangement of lines on the page 220.

Regardless of the manner in which the baselines Bn are determined, the handwritten input 899 can be edited by initially displaying the handwritten input 899 to the user upon a display 400 associated with the pen-enabled computing device 100. The user then selects an actuation position 910 relative to the handwritten input 899, such as by positioning the a cursor 912 through the use of a mouse, stylus, a track ball or the like, relative to the display of the handwritten input 899. Depending upon the location of the cursor relative to the bounding boxes 902 that surround each stroke 904, the pen-enabled computing device 100 may shift the cursor 912 position somewhat. In this regard, the central processing unit 320, in cooperation with the computer program product 500, determines if the cursor 912 position is located within a bounding box 902. If the cursor 912 position is located within one or more bounding boxes 902, the pen-enabled computing device 100 determines the x coordinate of the center of the largest bounding box 902. If the cursor position is at an x position greater than the x position of the center of the largest bounding box, the central processing unit 320 shifts the cursor 912 position to correspond to or be slightly larger than the largest x value 900b associated with the bounding box 902, i.e., shifts the cursor 912 to the right side of the largest bounding box. Alternatively, if the cursor 912 position has an x value that is less than the x position of the center of the largest bounding box 902, the central processing unit 320 shifts the cursor 912 position to an x position that is equal to the smallest x value 900a associated with the bounding box 902, i.e., shifts the cursor 912 position to the left of the smallest bounding box 902. If, however, the cursor 912 position is not within a bounding box 902, the cursor 912 position need not be shifted whatsoever.

The pen-enabled computing device 100 then determines the editing function based upon the user input. If text is being inserted, for example, the text may be input by means of keystrokes on the keypad or by a handwritten insert accomplished by further movement of the writing stylus 290 over the writing tablet 280 as described above. If text is being inserted, such as by means of the keypad, the strokes that define the handwritten input 899 to the right of the insertion are moved further to the right by an amount equal to the size, in the widthwise direction, of the inserted text. In instances in which text is inserted by means of alphanumeric characters input via keypad, the central processing unit 320 determines the number of characters being inserted and the font of the characters and moves the bounding boxes 902 containing the handwritten input to the right of the insert further to the right by an amount equal to the multiple of the number of characters being inserted and the font size of the inserted characters (hereinafter referenced as the width of the insert). In order to move the bounding boxes 902 containing the handwritten input to the right of the insert to the right, the x coordinate value of each coordinate pair 900 within a bounding box 902 on the same line as and to the right of the insert is increased by an amount equal to the width of the insert.

Similarly, a handwritten insertion is inserted by initially forming bounding boxes 902 about the strokes 904 that form the handwritten input 899. Thereafter, the bounding boxes 902 around existing handwritten input 899 on the same line as and to the right of the insert are moved further to the right by an amount equal to the width of the insert, which is defined in this instance as the difference in the smallest x value 900a associated with the leftmost bounding box 902 of the handwritten insertion and the largest x value 900b associated with the rightmost bounding box 902 of the handwritten insertion. As described above, the bounding boxes 902 of the existing handwritten input 899 that are being moved are altered by increasing the x coordinate of each coordinate pair 900 falling within the bounding boxes 902 by an amount equal to the width of the insert.

In addition to inserting text and/or a handwritten insertion, at least a portion of the existing handwritten input 899 can be deleted and the remaining handwritten input 899 moved so as to close up any gaps in the resulting handwritten input 899. In this regard, the central processing unit 320 effectively moves the bounding boxes 902 surrounding the remaining handwritten input 899 to the left by an amount equal to the width of the deleted bounding boxes 902, typically by reducing the x values of the coordinate pairs 900 that fall within each of the bounding boxes 902 of the remaining handwriting input 899. In either instance in which the editing involves the insertion or deletion of text or handwritten input 899, the central processing unit 320 can also wrap the resulting handwritten input 899 as appropriate depending upon the predefined margins and the like. While the above-described editing capabilities of the present invention relate to the editing of a handwritten input 899, a textual message that has been previously entered can also be edited, such as by inserting handwritten characters in the same fashion, if so desired.

By providing editing capabilities, the pen-enabled computing device 100 and associated methods of the present invention provide increased functionality by permitting a seamless editing of the textual or handwritten input 899 with either additional text or handwriting and appropriately spacing the resulting data without requiring extensive input from the user.

Thus, the editing function provided by the pen enabled computing device and associated method of the present invention will be quite intuitive to a user and will produce a resulting message that is appropriately spaced notwithstanding the insertion and deletion of handwriting and/or textual data.

The embodiments described herein address instances in which a single computer program product cooperates with the pen enabled computing device to accomplish the functions and processes further described herein. In some instances, the computer program product may operate, communicate, or otherwise interact with other computer program products such as, for example, personal information management (PIM) software or Web-based PIM or organizer software. These separate computer program products may be executing on the pen enabled computing device or on an external computing device in communication with the pen enabled computing device. As such, in these instances, a myriad of possible embodiments exist for editing, transferring, or otherwise manipulating data related to the nature of a page as identified by the system, computer program products, pen enabled computing device, and associated methods as described herein. Thus, it is understood that manipulation of data with a plurality of computer program products executing within a single or plurality of computing devices may provide further associated embodiments of the present invention as outlined below which will remain consistent with the spirit and scope of the present invention. Examples of embodiments for such a system are as follows:

1. Electronic ink based personal information management characterized by combinations of any or all of the below items:

electronic ink representations of items (e.g., schedule, to-do, contact) are stored in memory on the device for later transmission to personal information management (PIM) software running on a personal computer or to a web based organizer.

electronic ink items may be defined by placing forms on the device and spatially segmenting the handwriting which is produced on them (depends on page identification).

2. PIM system for displaying, modifying, augmenting, exporting, synchronizing, insuring consistency with paper items, conditionally translating handwriting to text, and printing mixed electronic ink and text items using PC PIM software or Web based PIM software.

electronic ink items as defined are displayed and can be modified by personal information management software on the personal computer or web based organizer. (items may be defined by segmentation depending on page id.)

items may be changed using personal information management software on the personal computer or Web organizer by standard techniques (e.g., keyboard and mouse editing, speech recognition, etc.

fields of the personal information management software on the personal computer or Web organizer accept and display both electronic ink and text when an item is changed on the personal computer or Web organizer, the personal information management software displays a message which recommends that the user print a page containing the item for his planner, or change the item on the device using the technique claimed below, in order to synchronize the handwritten version of the item with the electronic version items may be imported and/or exported to and/or from traditional personal information management software packages when an electronic ink item is to be exported to another package or database, an automatic on-line handwriting recognizer may be used to convert the item to a representation more suitable to the external package user configurable options may be set so that importing and/or exporting to and/or from other packages is automatic the user may be notified and required to resolve conflicts which may occur as a result of importing and/or exporting to and/or from other packages for schedule/calendar items, a message which indicates that a particular time slot has been reserved (e.g., "reserved") via handwriting may be exported to an external package. Such a message is sufficient in cases where the user wishes to keep the details of his appointments private from other external package users the personal information management software supports the printing of electronic ink based items, which may correspond to different views of information in the database (e.g., items which correspond to a certain period of time)

the user may be notified and required to resolve conflicts which may occur as a result of synchronizing the database on the PECS with the PC or Web PIM database the PC PIM or Web Organizer software may or may not organize and display information in the same way as the paper and PECS software. For example, there may be a page labeled "A1" which is the first page of contacts whose last name begins with the letter "A." The PC PIM software may group all contacts whose last name begins with "A" together for display purposes. If a change is made on the PC PIM side to handwritten information, the PIM software can warn the user that a change to information written on page "A1" occurred. Similarly, the user can print information from multiple physical pages (e.g., print all of the contacts whose last name begins with "A"). This implies that physical page id is part of the record for a contact.

use keyword button on PECS if the user wants to access database by other fields—e.g., company name. Could configure software to always try automatically recognizing certain fields.

a page printed from the PC PIM software has its identifiers highlighted by some means, so that the user knows which fields to activate in order to identify the page to the firmware. The PC PIM software may include a means for assigning a page identifier to a page printed from it. The printed page may have as its only electronic page identifier the fields corresponding to its identity. Electronic page identifiers can consist of cross-hatched boxes. Location of box can be known by table lookup, using record value (if page id is part of item record) or other key value as index.

3. A system for making changes to electronic ink items on the PECS changes may be made to items (e.g., schedule, to-do, contact) by tapping a special button on the device (e.g., a cancel button) either immediately preceding or immediately following the indication of the item (e.g., by drawing one continuous line through the item) "item" is meaningless without page id—segmentation into items depends on page id when an item is changed on the handwriting capture device, the PECS display indicates which item was changed 4. A system for making changes to or augmenting machine usable items on the PECS and reflecting those changes or augmentations in the PC PIM or Web organizer when a change should be made to a machine usable item on the device, it can be deleted and written on paper. PC PIM or Web organizer software can associate the deletion event with the production of new handwritten information and attempt to automatically recognize the new piece of information and replace the old information in the PC database with the new information. "New handwritten information" is associated with a particular page. Context for automatic recognition will depend on page id. Alternatively, the user can be asked to type (using the PC or Web access device) the new information while viewing an image of the handwritten information. In either case, the user can be asked to confirm that the new information should indeed replace the old information in the PC PIM or Web organizer database.

alternatively, the change can be made with buttons on the device or control mechanisms on the paper, for instance a keypad on a preprinted form if text (previously entered, machine usable) exists in a slot, and the user ignores the audible warning and message on the display when he writes in the slot, once the handwriting is uploaded, it may be displayed by the PIM or Web Organizer application in a balloon (bubble, tool-tip) near the slot when the cursor is placed near the slot if text (previously entered, machine usable) exists in a slot, and the user ignores the audible warning and message on the display when he writes in the slot, once the handwriting is uploaded, it may be displayed by the PIM or Web Organizer application in a nearby field (e.g., a field in a column labeled "additional notes")

if text (previously entered, machine usable) exists in a slot, and the user writes in the slot, he may be prompted after an audible warning as to whether or not he wants the handwriting to replace the machine usable text in the slot. By hitting the "No" button, the user may mean that the handwriting should be ignored altogether, i.e., the user made a mistake by writing in said slot.

regarding modifications to a schedule page, because the device has the time and date available, handwriting in a slot before the time of an appointment can be treated as modifications to the appointment itself, whereas handwriting in a slot during or after the time of the appointment can be treated as notes about the appointment. Modifications to the appointment are reflected on the device and in the PC PIM or Web Organizer software after upload, and notes about the appointment are treated as specified above.

pages printed from the PC PIM software may have holes on the right (equivalently, the printing is on the back side), so that they may be placed in a ringed binder alongside corresponding pages. For example, if the appointment schedule for a user is printed and placed alongside a schedule page for the same day, the user may make notes about the appointments on the right-hand schedule page which are captured by the PECS and treated accordingly by the PC PIM or Web organizer software, while viewing the details of the appointments on the facing page.

5. A system for retrieving and displaying items on the PECS in response to user input electronic versions of items may be displayed if available on the PECS, when the user places the pen above or on the item or in response to other activations of control mechanisms. Other information associated with the item may optionally be displayed (e.g., date assigned in the case of a to-do item)

6. A system for reflecting change to item in PC PIM or Web organizer on PECS and on paper when an item is changed on the personal computer, and the user changes the item on the device using the technique claimed above, the user may prefer to make a note or check a box or press a button indicating that an electronic version of the information is available for display on the device.

when changing an item after tapping the cancel button as described above, the stroke that identifies the item to be changed may itself be the note that indicates that an electronic version of the item is available.

7. A system for changing the state of certain variables by using checkboxes associated with items a checkbox may be associated with certain items. Its state may be toggled when the pen is placed down in it (e.g., alarm on, alarm off; recurring to-do item on, recurring to-do item off).

the state of a checkbox may be displayed when the pen is placed over or in it (e.g., alarm is on)

8. A system for managing electronic ink based to-do lists characterized by combinations of any or all of the below items:

placing forms on the device which represent to-do lists with electronic form identifiers and visual form identifiers segmenting items in the to-do list based on their spatial location on the form 9. A system for interacting with to-do list items on the PECS holding the pen over or on some part of a to-do list item gives information about the to-do list item, e.g. pen on the item shows the date the item was assigned on the LCD marking an item as completed both electronically and on paper by checking a box associated with the item marking an item as recurring both electronically and on paper by checking a box associated with the item assigning a priority level to an item both electronically and on paper by checking a box associated with the item (e.g., numerical or high, medium, low)

displaying on the LCD the identity of the to-do list form in use (e.g., "To-do list Nov. 29, 1998"). The identity may be defined by the date and type of form and indicated by the method claimed above on a to-do list, if it is assumed that the user writes items in sequence and does not skip an item or items, then the condition where the user has failed to correctly identify the page on which he is writing can be detected if the user writes in a slot which is greater than the next expected slot for the current software page. If this condition occurs, the user can be warned appropriately.

10. A system for interacting with to-do list items using PC PIM or Web organizer software personal information management software on the personal computer or web organizer software which allows combined ink and text to-do list items to be sorted and viewed by status (complete or incomplete)

personal information management software on the personal computer or web organizer software which allows combined ink and text to-do list items to be sorted and viewed by priority (e.g., high, medium, low)

personal information management software on the personal computer or web organizer software which allows combined ink and text to-do list items to be sorted and viewed by date assigned (Background: the handwriting capture device associates a date and time with every stroke. The date assigned can be defined as the date a to-do list item was entered on the list.)

personal information management software on the personal computer or web organizer software which allows combined ink and text to-do list items to be sorted and viewed by date scheduled to be completed (The date scheduled to be completed can be defined as the date associated with a particular instance of the to-do list form.)

personal information management software on the personal computer or web organizer software which allows combined ink and text to-do list items to be sorted and viewed by date completed (The date completed can be defined as the date the completed checkbox was checked, since the device associates a date and time with every stroke.)

personal information management software on the personal computer or web organizer software which allows a table or tables of combined ink and text to-do list items to be displayed along with associated values such as priority, status, date assigned, date scheduled to be completed and date completed personal information management software on the personal computer or web organizer software which allows subsets of combined ink and text to-do list items to be displayed, possibly along with associated information defined above, based on dates (e.g., assigned, scheduled, or completed), i.e. daily, weekly, or monthly views 11. A system for managing electronic ink based address books or contact lists characterized by combinations of any or all of the below items:

placing forms on the device which represent contact lists (see attached example) with visual form identifiers and electronic form identifiers segmenting items in the contact list based on their spatial location on the form, after the form has been identified by activation of the electronic form identifier 12. A system for interacting with contact list items on the PECS holding the pen over or on some part of a contact list item gives information about the contact list item, e.g., pen on part of the item shows the contact's birthday, which may have been entered using the personal information management software on the personal computer or web organizer software special boxes may be part of a contact list item, and may be used to indicate when certain events related to the contact occur, just by placing strokes in the boxes, because the device date and time stamps each stroke (e.g., I reach a certain point in the sales cycle with a customer, I check a box. I contact the customer, I check a box)

13. A system for interacting with contact list items using the PC PIM Software or Web Organizer Software by using the boxes claimed above, the personal information management software can display contacts which fall into date driven categories (e.g., here are the contacts you were in touch with least recently, here are the contacts you were in touch with most recently, here are all of the contacts with whom you were at a certain point in the sales cycle by the given date, etc.)

14. A system for displaying information from various databases by interacting with the forms based PECS and allowing separate navigation context and physical page context on devices which have more physical buttons than existing pen enabled computing devices, for example, buttons that allow the user to identify dates and letters of the alphabet, the user may rapidly access machine usable information by tapping those buttons, rather than first indicating page identifiers on the paper to access machine usable information. For example, by tapping the letter "A" in nearly any context, the device may display contacts whose last name begins with the letter "A," and allow the user to scroll through them.

on the device of the previous paragraph, it may be useful to have a button whose meaning is "return to the previous page identifier." For example, if a user is scheduling an appointment, wants to look up a name in the contacts database by tapping a button, then return to the appointment scheduling task on the current physical page, he returns by tapping said button. Alternatively, the physical paper context may not change as a result of changing the navigation context, that is, all handwriting is associated with the physical paper context.

on such devices, it may be useful to always identify pages by writing on the paper, and use the extra buttons for navigation through the PIM database. In this case, the "OK" button could mean "return to (e.g., display) the context where the user was writing." Alternatively, the current paper context could be continuously displayed along with the current "navigation" context, when the two are different. The default is for the "paper context" and "navigation" contexts to be the same and be indicated by the page change operation.

when the user is using a particular page, and the page context is the same as the navigation context, the page forward and page backward buttons of the PECS allow navigation through the machine usable items corresponding to that page or page type, if the current page is not a notes page. The page forward and page backward buttons also allow navigation through the items corresponding to the navigation context, if it is different from the page context.

Aids for navigation through machine usable data of the type corresponding to a particular page can be printed on the paper. For example, a page of contacts might include a "previous" box, a "next" box, a "name" box, a "phone" box, a "fax" box, and an "e-mail" box. Tapping the "next" box with the pen shows the next contact in machine usable form corresponding to the current page in alphabetical order. Tapping the "fax" and "e-mail" boxes would display the fax number and e-mail address for that contact.

15. A system for providing games for user familiarization, training, entertainment and education: Operation and State Identification In order to prepare and train the user to make marks in boxes on the paper to identify pages and navigate through machine usable data, games which require the user to touch certain parts of the paper after a prompt can be included. A game modeled after "Operation" is one example. After the "Operation" page is identified, the display shows the name of a bone. The user must place the pen in the box corresponding to the bone within a certain amount of time or a negative, low frequency sound is heard. Another example is a state identification game. A map of the United States is printed on the page. After the map page is identified, the name of a state is displayed and the state must be touched on the map within a certain period of time or a negative, low frequency sound is heard. There are obvious variations of these types of games. For example, a state capital name can be displayed and the corresponding state must be touched.

16. Trip meter application

Another personal information management application is a trip meter. A starting point and a destination could be touched on a map, and the driving distance, driving time, and/or flying time between the two points could be displayed.

17. Expense tracking

Expenses can be tracked using the PIM system. As long as the user writes down his expenses on the day they occur, they will be organized correctly by date for the expense reporting software automatically, because the device date and time stamps the writing.

18. A PIM system where user interface elements for controlling the state of the system are printed on the paper.

Thus, embodiments of the present invention provide a pen enabled computing device having the innate capability of processing or otherwise manipulating recorded pen input data. Embodiments of the present invention also provide a pen enabled computing device having the capability of detecting the presence of a page engaged with the device and determining the type of form with a minimum of separate identification devices and required user-initiated operations. According to a particularly advantageous aspect, the user uses the form according to its identified function and does not otherwise have to independently indicate the nature of the form to the pen enabled computing device. Accordingly, embodiments of the present invention provide a pen enabled computing device having the capability of determining the type of form engaged therewith without requiring additional components or special modification of the form to indicate the type of form to the device. Embodiments of the present invention also provide an associated method of identifying a form to a pen enabled computing device, while indicating the type of form as well as uniquely identifying forms having multiple pages and multiple pages of a single type of form. Advantageously, such a method accomplishes the identification of the page to the pen enabled computing system while occupying minimal, if any, space on the writing surface of the page. Thus, embodiments of the present invention provide a pen enabled computing device capable of specifically identifying the page being used therewith in order to facilitate future data modification, access, and manipulation in an efficient and expedient manner to provide enhanced seamless and automatic operation with minimal inconvenience and enhanced flexibility for the user.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for capturing handwritten data, the method comprising:
   detecting, at a computing device comprising a handwriting capture interface, a first position and movement associated with an actuation of the handwriting capture interface to define a handwritten input;
   in response to detecting the first position and movement associated with the actuation, defining at least one bounding box encompassing at least a portion of individual strokes of the handwritten input, wherein a size of the at least one bounding box is based on the first position and movement associated with the actuation; and
   in response to defining the at least one bounding box, storing the handwritten input and the at least one bounding box.

2. The method of claim 1, wherein detecting the first position and movement associated with the actuation comprises sampling the first position and movement associated with the actuation to form a coordinate representation of individual strokes of the handwritten input.

3. The method of claim 2, further comprising determining at least one baseline for individual strokes of the handwritten input.

4. The method of claim 3, wherein the determining at least one baseline comprises at least one of detecting a second position and movement associated with the actuation to locate the at least one baseline or receiving an output from a keypad.

5. A method for capturing handwritten data, the method comprising:
   detecting, at a computing device comprising a handwriting capture interface, a first position and movement associated with an actuation of the handwriting capture interface to define a handwritten input, wherein detecting the first position and movement associated with the actuation comprises sampling the first position and movement associated with the actuation to form a coordinate representation of individual strokes of the handwritten input;

in response to detecting the first position and movement associated with the actuation, defining at least one bounding box encompassing at least a portion of individual strokes of the handwritten input, wherein a size of the at least one bounding box is based on the first position and movement associated with the actuation;

storing the handwritten input and the at least one bounding box; and determining at least one baseline for individual strokes of the handwritten input, wherein the determining at least one baseline comprises detecting changes in a one-dimensional histogram comprising an axis having a number of predetermined points along the axis, wherein the histogram comprises a count for individual predetermined points along the axis, the count defining the individual strokes of the handwritten input that pass through the individual predetermined points along the axis, wherein the at least one baseline is determined relative to a point along the axis corresponding to at least one predetermined point having a large count relative to other predetermined points.

6. The method of claim 3, wherein the at least one baseline comprises at least a portion of the at least one bounding box.

7. The method of claim 3, further comprising modifying the size of the at least one bounding box, wherein at least a portion of the at least one bounding box comprises at least a portion of the at least one baseline.

8. The method of claim 1, wherein the computing device comprises a pen-enabled computing device.

9. A computing device apparatus comprising:
a handwriting capture interface;
a memory element configured to store information associated with signals received from the capture interface; and
a processing device configured to be in communication with the memory element, wherein the processing device is configured to:
detect a first position and movement associated with an actuation of the handwriting capture interface to form a handwritten input;
in response to detection of the first position and movement associated with the actuation, define at least one bounding box encompassing at least a portion of individual strokes of the handwritten input, wherein a size of the at least one bounding box is based on the first position and movement associated with the actuation; and
in response to defining the at least one bounding box, store the handwritten input and the at least one bounding box in the memory element.

10. The apparatus of claim 9, wherein the processing device is further configured to sample the first position and movement associated with the actuation of the handwriting capture interface to form a coordinate representation of individual strokes of the handwritten input.

11. The apparatus of claim 10, wherein the processing device is further configured to determine at least one baseline for individual strokes of the handwritten input, and the at least one baseline comprises a location and at least a portion of the at least one bounding box.

12. The apparatus of claim 11, wherein the processing device is further configured to at least one of detect a second position and movement associated with the actuation to define the location of the at least one baseline or receive an output from a keypad to define the location of the at least one baseline.

13. A computing device apparatus comprising:
a handwriting capture interface;
a memory element configured to store information associated with signals received from the capture interface; and
a processing device configured to be in communication with the memory element, wherein the processing device is configured to:
detect a first position and movement associated with an actuation of the handwriting capture interface to form a handwritten input;
in response to detection of the first position and movement associated with the actuation, define at least one bounding box encompassing at least a portion of individual strokes of the handwritten input, wherein a size of the at least one bounding box is based on the first position and movement associated with the actuation;
store the handwritten input and the at least one bounding box in the memory element;
sample the first position and movement associated with the actuation of the handwriting capture interface to form a coordinate representation of individual strokes of the handwritten input;
determine at least one baseline for individual strokes of the handwritten input, and the at least one baseline comprises a location and at least a portion of the at least one bounding box, wherein the location of the at least one baseline is based on changes in a one-dimensional histogram comprising an axis having a number of predetermined points along the axis, wherein the histogram comprises a count for individual predetermined points along the axis, the count defining the individual strokes of the handwritten input that pass through the individual predetermined points along the axis, wherein the location of the at least one baseline is determined relative to a point along the axis corresponding to the predetermined point having a large count relative to other predetermined points.

14. The apparatus of claim 11, wherein the at least one baseline comprises at least a portion of the at least one bounding box.

15. The apparatus of claim 11, further comprising modifying the size of the at least one bounding box, wherein at least a portion of the bounding box comprises at least a portion of the at least one baseline.

16. A tangible computer readable medium configured to store instructions configured to cause a computing device to perform operations comprising:
detecting a first motion associated with an actuation of a handwriting capture interface in communication with the computing device to define a handwritten input comprising a coordinate representation of individual strokes of the handwritten input;
in response to detecting the first motion associated with the actuation, defining at least one bounding box encompassing at least a portion of individual strokes of the handwritten input, wherein a size of the at least one bounding box is based on the first motion associated with the actuation; and
in response to defining the at least one bounding box, storing the handwritten input and the at least one bounding box.

17. The computer readable medium of claim 16, further configured to cause the computing device to perform operations comprising determining a location of at least one baseline based on the coordinate representation of individual strokes of the handwritten input.

18. The computer readable medium of claim 17, wherein the determining the location comprises at least one of detecting a second motion of the actuation to define the location or receiving an output from a keypad to define to the location.

19. A tangible computer readable medium configured to store instructions configured to cause a computing device to perform operations comprising:

detecting a first motion associated with an actuation of a handwriting capture interface in communication with the computing device to define a handwritten input comprising a coordinate representation of individual strokes of the handwritten input;

in response to detecting the first motion associated with the actuation, defining at least one bounding box encompassing at least a portion of individual strokes of the handwritten input, wherein a size of the at least one bounding box is based on the first motion associated with the actuation;

storing the handwritten input and the at least one bounding box; and determining a location of at least one baseline based on the coordinate representation of individual strokes of the handwritten input, wherein the determining the location comprises detecting changes in a one-dimensional histogram comprising an axis having a number of predetermined points along the axis, wherein the histogram comprises a count for individual predetermined points along the axis, the count defining the individual strokes of the handwritten input that pass through the individual predetermined points along the axis, wherein the at least one baseline is determined relative to a point along the axis corresponding to at least one predetermined point having a large count relative to other predetermined points.

* * * * *

UNITED STATES PATENT AND TRADEMARK OFFICE
CERTIFICATE OF CORRECTION

| | | |
|---|---|---|
| PATENT NO. | : 8,115,748 B2 | |
| APPLICATION NO. | : 12/818646 | |
| DATED | : February 14, 2012 | |
| INVENTOR(S) | : Clary | |

It is certified that error appears in the above-identified patent and that said Letters Patent is hereby corrected as shown below:

Page 2, item (56), under "Other Publications", in Column 2, Line 3, delete "Ecriteck" and insert -- Ecritek --.

Page 2, item (56), under "Other Publications", in Column 2, Line 10, delete ""Anoton—join" and insert -- "Anoto—join --.

Page 2, item (56), under "Other Publications", in Column 2, Line 20, delete "1 total pages." and insert -- 1 total page. --.

Page 3, item (56), under "Other Publications", in Column 1, Line 6, delete "1011-1015." and insert -- 10/1-10/5. --.

Signed and Sealed this
Fourteenth Day of August, 2012

David J. Kappos
*Director of the United States Patent and Trademark Office*